US011574148B2

(12) United States Patent
Kartal et al.

(10) Patent No.: US 11,574,148 B2
(45) Date of Patent: *Feb. 7, 2023

(54) SYSTEM AND METHOD FOR DEEP REINFORCEMENT LEARNING

(71) Applicant: ROYAL BANK OF CANADA, Toronto (CA)

(72) Inventors: Bilal Kartal, Edmonton (CA); Pablo Francisco Hernandez Leal, Edmonton (CA); Matthew Edmund Taylor, Edmonton (CA)

(73) Assignee: ROYAL BANK OF CANADA, Toronto (CA)

(*) Notice: Subject to any disclaimer, the term of this patent is extended or adjusted under 35 U.S.C. 154(b) by 625 days.

This patent is subject to a terminal disclaimer.

(21) Appl. No.: 16/674,932

(22) Filed: Nov. 5, 2019

(65) Prior Publication Data
US 2020/0143206 A1 May 7, 2020

Related U.S. Application Data

(60) Provisional application No. 62/755,839, filed on Nov. 5, 2018.

(51) Int. Cl.
*G06K 9/62* (2022.01)
*G06N 3/04* (2006.01)
*G06N 3/08* (2006.01)

(52) U.S. Cl.
CPC ......... *G06K 9/6262* (2013.01); *G06N 3/0454* (2013.01); *G06N 3/0472* (2013.01); *G06N 3/08* (2013.01)

(58) Field of Classification Search
CPC .. G06K 9/6262; G06K 9/6271; G06N 3/0454; G06N 3/0472; G06N 3/08;
(Continued)

(56) References Cited

U.S. PATENT DOCUMENTS 8,103,606 B2 1/2012 Moussa
11,295,174 B2 * 4/2022 Hernandez Leal ..... G06F 17/16
(Continued)

OTHER PUBLICATIONS

Anthony, T.; Tian, Z.; and Barber, D. 2017. Thinking fast and slow with deep learning and tree search. In Advances in Neural Information Processing Systems, 5360-5370.
(Continued)

*Primary Examiner* — Bobbak Safaipour
(74) *Attorney, Agent, or Firm* — Norton Rose Fulbright Canada LLP

(57) ABSTRACT

A computer system and method for extending parallelized asynchronous reinforcement learning for training a neural network is described in various embodiments, through coordinated operation of plurality of hardware processors or threads such that each functions as a worker agent that is configured to simultaneously interact with a target computing environment for local gradient computation based on a loss determination and to update global network parameters based at least on local gradient computation to train the neural network through modifications of weighted interconnections between interconnected computing units as gradient computation is conducted across a plurality of iterations of a target computing environment, the loss determination including at least a policy loss term (actor), a value loss term (critic), and an auxiliary control loss. Variations are described further where the neural network is adapted to include terminal state prediction and action guidance.

20 Claims, 25 Drawing Sheets

(58) Field of Classification Search
CPC ........ G06N 3/084; G06N 5/003; G06N 7/005; G06N 3/006; G06V 10/82
See application file for complete search history.

(56) References Cited

U.S. PATENT DOCUMENTS

| | | | |
|---|---|---|---|
| 2017/0358293 A1* | 12/2017 | Chua .................... | G10L 15/16 |
| 2018/0060301 A1 | 3/2018 | Li | |
| 2019/0049957 A1 | 2/2019 | Healey | |
| 2019/0258918 A1 | 8/2019 | Wang | |
| 2019/0258938 A1 | 8/2019 | Winih | |
| 2020/0033869 A1 | 1/2020 | Palanisamy | |
| 2020/0143208 A1* | 5/2020 | Hernandez Leal ...... | G06N 3/08 |
| 2020/0143239 A1* | 5/2020 | Simonyan ............. | G06N 5/003 |
| 2021/0192358 A1 | 6/2021 | Song | |
| 2022/0165253 A1* | 5/2022 | Sharifi .................. | G10L 15/28 |

OTHER PUBLICATIONS

Arulkumaran, K.; Deisenroth, M. P.; Brundage, M.; and Bharath, A. A. 2017. Deep reinforcement learning: A brief survey. IEEE Signal Processing Magazine 34(6):26-38.

Best, G.; Cliff, O. M.; Patten, T.; Mettu, R. R.; and Fitch, R. 2018. Dec-MCTS: Decentralized planning for multi-robot active perception. The International Journal of Robotics Research 0278364918755924.

Browne, C. B.; Powley, E.; Whitehouse, D.; Lucas, S. M.; Cowling, P. L; Rohlfshagen, P.; Tavener, S.; Perez, D. Samothrakis, S.; and Colton, S. 2012. A survey of Monte Carlo tree search methods. IEEE Transactions on Computational Intelligence and AI in games 4(1):1-43.

Christiano, P. F.; Leike, J.; Brown, T.; Martie, M.; Legg, S.; and Amodei, D. 2017. Deep reinforcement learning from human preferences. In Advances in Neural Information Processing Systems, 4299-4307.

Clevert, D.-A.; Unterthiner, T.; and Hochreiter, S. 2015. Fast and accurate deep network learning by exponential linear units (ELUs) arXiv preprint arXiv:1511.07289.

Coulom, R. 2006. Efficient selectivity and backup operators in Monte-Carlo tree search. In van den Herik, H. J.; Ciancarini, P.; and Donkers, J., eds., Computers and Games, vol. 4630 of LNCS. Springer. 72-83.

Cruz Jr, G. V.; Du, Y.; and Taylor, M. E. 2017. Pre-training neural networks with human demonstrations for deep reinforcement learning. arXiv preprint arXiv:1709.04083.

Espeholt, L.; Soyer, H.; Munos, R.; Simonyan, K.; Mnih, V.;Ward, T.; Doron, Y.; Firoiu, V.; Harley, T.; Dunning, I.; et al. 2018. IMPALA: Scalable distributed Deep-RL with importance weighted actor-learner architectures. arXiv preprint arXiv:1802.01561.

Gao, C.; Muller, M.; and Hayward, R. 2018. Three-Head Neural Network Architecture for Monte Carlo Tree Search. In IJCAI, 3762-3768.

Gruslys, A.; Dabney,W.; Azar, M. G.; Piot, B.; Bellemare, M.; and Munos, R. 2018. The reactor: A fast and sample-efficient actorcritic agent for reinforcement learning.

Hausknecht, M., and Stone, P. 2015. Deep Recurrent Q-Learning for Partially Observable MDPs.

Hernandez-Leal, P.; Kartal, B.; and Taylor, M. E. 2018. Is multiagent deep reinforcement learning the answer or the question? A brief survey. arXiv preprint arXiv:1810.05587.

Hester, T.; Vecerik, M.; Pietquin, O.; Lanctot, M.; Schaul, T.; Piot, B.; Horgan, D.; Quan, J.; Sendonaris, A.; Dulac-Arnold, G.; et al. 2017. Deep q-learning from demonstrations. arXiv preprint arXiv:1704.03732.

Jaderberg, M.; Mnih, V.; Czarnecki, W. M.; Schaul, T.; Leibo, J. Z.; Silver, D.; and Kavukcuoglu, K. 2016. Reinforcement learning with unsupervised auxiliary tasks. arXiv preprint arXiv:1611.05397.

Kartal, B.; Sohre, N.; and Guy, S. J. 2016. Data Driven Sokoban Puzzle Generation with Monte Carlo Tree Search. In Twelfth Artificial Intelligence and Interactive Digital Entertainment Conference.

Kim, B.; Farahmand, A.-m.; Pineau, J.; and Precup, D. 2013. Learning from limited demonstrations. In Advances in Neural Information Processing Systems, 2859-2867.

Kingma, D. P., and Ba, J. 2014. Adam: A method for stochastic optimization. arXiv preprint arXiv:1412.6980.

Kocsis, L., and Szepesv'ari, C. 2006. Bandit based Monte-Carlo planning. In Proc. European Conf. on Machine Learning (ECML). Springer. 282-293.

Konda, V. R., and Tsitsiklis, J. N. 2000. Actor-critic algorithms. In Advances in neural information processing systems, 1008-1014.

LaValle, S. M. 2006. Planning algorithms. Cambridge university press.

LeCun, Y.; Bengio, Y.; and Hinton, G. 2015. Deep learning, nature 521(7553):436.

Li, Y. 2017. Deep reinforcement learning: An overview. arXiv preprint arXiv:1701.07274.

Loftin, R. T.; MacGlashan, J.; Peng, B.; Taylor, M. E.; Littman, M. L.; Huang, J.; and Roberts, D. L. 2014. A strategy-aware technique for learning behaviors from discrete human feedback.

Mnih, V.; Kavukcuoglu, K.; Silver, D.; Rusu, A. A.; Veness, J.; Bellemare, M. G.; Graves, A.; Riedmiller, M.; Fidjeland, A. K.; Ostrovski, G.; et al. 2015. Human-level control through deep reinforcement learning. Nature 518(7540):529.

Mnih, V.; Badia, A. P.; Mirza, M.; Graves, A.; Lillicrap, T.; Harley, T.; Silver, D.; and Kavukcuoglu, K. 2016. Asynchronous methods for deep reinforcement learning. In International conference on machine learning, 1928-1937.

Nair, A.; McGrew, B.; Andrychowicz, M.; Zaremba, W.; and Abbeel, P. 2018. Overcoming exploration in reinforcement earning with demonstrations. In 2018 IEEE International Conference on Robotics and Automation (ICRA), 6292-6299. IEEE.

2018. Open AI Five, https://blog.openai.com/openai-five. [Online; accessed Oct. 15, 2018].

Resnick, C.; Eldridge, W.; Ha, D.; Biilz, D.; Foerster, J.; Togelius, J.; Cho, K.; and Bruna, J. 2018. Pommerman: A multi-agent playground. arXiv preprint arXiv:1809.07124.

Ross, S.; Gordon, G.; and Bagnell, D. 2011. A reduction of imitation learning and structured prediction to no-regret online learning. In Proceedings of the fourteenth international conference on artificial intelligence and statistics, 627-635.

Schulman, J.; Wolski, F.; Dhariwal, P.; Radford, A.; and Klimov, O. 2017. Proximal policy optimization algorithms. arXiv preprint arXiv:1707.06347.

Silver, D.; Huang, A.; Maddison, C. J.; et al. 2016. Mastering the game of Go with deep neural networks and tree search. Nature 529(7587):484-489.

Silver, D.; Schrittwieser, J.; Simonyan, K.; Antonoglou, L; Huang, A.; Guez, A.; Hubert, T.; Baker, L.; Lai, M.; Bolton, A.; et al. 2017. Mastering the game of go without human knowledge. Nature 550(7676):354.

Subramanian, K.; Isbell Jr, C. L.; and Thomaz, A. L. 2016. Exploration from demonstration for interactive reinforcement learning. In Proceedings of the 2016 International Conference on Autonomous Agents & Multiagent Systems, 447-456. International Foundation for Autonomous Agents and Multiagent Systems.

Sun, W.; Venkatraman, A.; Gordon, G. J.; Boots, B.; and Bagnell, J. A. 2017. Deeply aggravated: Differentiable imitation learning for sequential prediction. arXiv preprint arXiv:1703.01030.

Sutton, R. S., and Barto, A. G. 2018. Reinforcement learning: An introduction.

Wang, Z.; Bapst, V.; Heess, N.; Mnih, V.; Munos, R.; Kavukcuoglu, K.; and de Freitas, N. 2016. Sample efficient actor-critic with experience replay. arXiv preprint arXiv:1611.01224.

Watkins, C. J., and Dayan, P. 1992. Q-learning. Machine learning 8(3-4):279-292.

Williams, R. J. 1992. Simple statistical gradient-following algorithms for connectionist reinforcement learning. Machine learning 8(3-4):229-256.

(56) References Cited

OTHER PUBLICATIONS

Yu, Y. 2018. Towards sample efficient reinforcement learning. In IJCAI, 5739-5743.

Zhang, M. M.; Atanasov, N.; and Daniilidis, K. 2017. Active endeffector pose selection for tactile object recognition through monte carlo tree search. In Intelligent Robots and Systems (IROS), 2017 IEEE/RSJ International Conference on, 3258-3265. IEEE.

Auer, Cesa-Bianchi, and Fischer 2002] Auer, P.; Cesa-Bianchi, N.; and Fischer, P. 2002. Finite-time analysis of the multiarmed bandit problem. Machine Learning 47(2-3):235-256.

Bejjani et al. 2018] Bejjani, W.; Papallas, R.; Leonetti, M.; and Dogar, M. R. 2018. Planning with a receding horizon for manipulation in clutter using a learned value function. In 2018 IEEE-RAS 18th International Conference on Humanoid Robots (Humanoids), 1-9.

Borovikov et al. 2019] Borovikov, I.; Zhao, Y.; Beirami, A.; Harder, J.; Kolen, J.; Pestrak, J.; Pinto, J.; Pourabolghasem, R.; Chaput, H.; Sardari, M.; et al. 2019. Winning isn't everything: Training agents to playtest modern games. In AAAI Workshop on Reinforcement Learning in Games.

Bouzy, B. 2005. Associating domain-dependent knowledge and Monte Cado approaches within a Go program. Infomnation Sciences 175(4):247-257.

Holmgard, C.; Green, M. C.; Liapis, A.; and Togelius, J. 2018. Automated playtesting with procedural personas through MCTS with evolved heuristics. arXiv preprint arXiv:1802.06881.

Ilhan, E., and Etaner-Uyar, A. S. 2017. Monte carlo tree search with temporal-difference learning for general video game playing. In 2017 IEEE Conference on Computational Intelligence and Games (CIG), 317-324.

Guo, X.; Singh, S.; Lee, H.; Lewis, R. L.; and Wang, X. 2014. Deep learning for real-time atari game play using offline Monte-Carlo tree search planning. In NIPS, 3338-3346.

Kartal, B.; Godoy, J.; Karamouzas, I.; and Guy, S. J. 2015. Stochastic tree search with useful cycles for patrolling problems. In 2015 IEEE International Conference on Robotics and Automation (ICRA), 1289-1294.

Kartal, Koenig, and Guy 2014] Kartal, B.; Koenig, J.; and Guy, S. J. 2014. User-driven narrative variation in large story domains using Monte Carlo tree search. In AAMAS, 69-76.

Lee, J.; Balakrishnan, A.; Gaurav, A.; Czarnecki, K.; and Sedwards, S. 2019. Wisemove: A framework for safe deep reinforcement learning for autonomous driving. arXiv preprint arXiv:1902.04118.

Leonetti, M.; Iocchi, L.; and Stone, P. 2016. A synthesis of automated planning and reinforcement learning for efficient, robust decision-making. Artificial Intelligence 241:103-130.

Matiisen, T. 2018. Pommerman baselines. https://github.com/tambetm/pommerman-baselines/blob/master/mcts/README.md.

Suddarth, S. C., and Kergosien, Y. 1990. Rule-injection hints as a means of improving network performance and learning time. In Neural Networks. Springer. 120-129.

Zhou, H.; Gong, Y.; Mugrai, L.; Khalifa, A.; Nealen, A.; and Togelius, J. 2018. A hybrid search agent in pommerman. In Proceedings of the 13th International Conference on the Foundations of Digital Games.

Soemers, D. J.; Sironi, C. F.; Schuster, T.; and Winands, M. H. 2016. Enhancements for real-time Monte Carlo tree search in general video game playing. In 2016 IEEE Conference on Computational Intelligence and Games (CIG), 1-8.

Sturtevant, N. R. 2015. Monte Carlo tree search and related algorithms for games. Game AI Pro 2: Collected Wisdom of Game AI Professionals.

Vodopivec, T.; Samothrakis, S.; and Ster, B. 2017. On Monte Carlo tree search and reinforcement learning. JAIR 60:881-936.

Sutton, R. S.; Modayil, J.; Delp, M.; Degris, T.; Pilarski, P. M.; White, A.; and Precup, D. 2011. Horde: A scalable real-time architecture for learning knowledge from unsupervised sensorimotor interaction. In AAMAS.

Zook, A.; Harrison, B.; and Riedl, M. O. 2015. Monte-Carlo tree search for simulation-based strategy analysis. In Proceedings of the 10th Conference on the Foundations of Digital Games.

Bellemare, M. G.; Dabney, W.; Dadashi, R.; Taiga, A. A.; Castro, P. S.; Roux, N. L.; Schuurmans, D.; Lattimore, T.; and Lyle, C. 2019. A geometric perspective on optimal representations for reinforcement learning. arXiv preprint arXiv:1901.11530.

Brockman, G.; Cheung, V.; Pettersson, L.; Schneider, J.; Schulman, J.; Tang, J.; and Zaremba, W. 2016. OpenAI gym.arXiv preprint arXiv:1606.01540.

Chrabaszcz, P.; Loshchilov, I.; and Hutter, F. 2018. Back to basics: Benchmarking canonical evolution strategies for playing atari. arXiv preprint arXiv:1802.08842.

Du, Y.; Czarnecki,W. M.; Jayakumar, S. M.; Pascanu, R.; and Lakshminarayanan, B. 2018. Adapting auxiliary losses using gradient similarity. arXiv preprint arXiv:1812.02224.

Emekligil, E., and Alpaydin, E. 2018. What's in a game? the effect of game complexity on deep reinforcement learning. In Workshop on Computer Games, 147-163.

Fedus, W.; Gelada, C.; Bengio, Y.; Bellemare, M. G.; and Larochelle, H. 2019. Hyperbolic discounting and learning over multiple horizons. arXiv preprint arXiv:1902.06865.

Francois-Lavet, V.; Henderson, P.; Islam, R.; Bellemare, M. G.; Pineau, J.; et al. 2018. An introduction to deep reinforcement learning. Foundations and Trends in Machine Learning 11(3-4):219-354.

Garcia, J., and Fernandez, F. 2015. A comprehensive survey on safe reinforcement learning. Journal of Machine Learning Research 16(1):1437-1480.

Wang, P.; Rowe, J. P.; Min, W.; Mott, B. W.; and Lester, J. C. 2017. Interactive narrative personalization with deep reinforcement learning. In IJCAI, 3852-3858.

Lample, G., and Chaplot, D. S. 2017. Playing FPS Games with Deep Reinforcement Learning. In AAAI, 2140-2146.

Leibfried, F., and Vrancx, P. 2018. Model-based regularization for deep reinforcement learning with transcoder networks. arXiv preprint 1809.01906.

Leibfried, F.; Kushman, N.; and Hofmann, K. 2016. A deep learning approach for joint video frame and reward prediction in atari games. In ICML 2017 Workshop on Principled Approaches to Deep Learning.

Mirowski, P.; Pascanu, R.; Viola, F.; Soyer, H.; Ballard, A. J.; Banino, A.; Denil, M.; Goroshin, R.; Sifre, L. Kavukcuoglu, K.; et al. 2016 Learning to navigate in complex environments. In ICLR.

Oh, J.; Guo, X.; Lee, H.; Lewis, R. L.; and Singh, S. 2015. Action-conditional video prediction using deep networks in atari games. In NIPS, 2863-2871.

Resnick, C.; Raileanu, R.; Kapoor, S.; Peysakhovich, A.; Cho, K.; and Bruna, J. 2019. Backplay:"man muss immer umkehren". AAAI-19 Workshop on RL in Games.

Sharifi, A.; Zhao, R.; and Szafron, D. A. 2010. Learning companion behaviors using reinforcement learning in games. In Sixth Artificial Intelligence and Interactive Digital Entertainment Conference.

Shelhamer, E.; Mahmoudieh, P.; Argus, M.; and Darrell, T. 2016. Loss is its own reward: Self-supervision for reinforcement learning. arXiv preprint arXiv:1612.07307.

Baier, H., and Winands, M. H. 2018. MCTS-minimax hybrids with state evaluations. JMLR 62:193-231.

Albrecht, S. et al., "A Game-Theoretic Model and Best-Response Learning Method for Ad Hoc Coordination in Multiagent Systems", Proceedings of the 12th International Conference on Autonomous Agents and Multi-Agent Systems, 2013, pp. 1155-1156.

Albrecht, S. et al., "Autonomous Agents Modelling Other Agents: A Comprehensive Survey and Open Problems", Artificial Intelligence, 2018, 258, pp. 66-95.

Rao, Y. et al., "Learning Globally Optimized Object Detector via Policy Gradient," 2018 IEEE/CVF Conference on Computer Vision and Pattern Recognition, 2018, pp. 6190-6198, doi: 10.1109/CVPR.2018.00648. (Year: 2018).

Banerjee, B. et al., "Efficient Learning of Multistep Best Response", Proceedings of the 4th International Conference or Autonomous Agents and Multiagent Systems, 2005, pp. 60-66.

(56) References Cited

OTHER PUBLICATIONS

Bansal, T. et al., "Emergent Complexity via Multi-Agent Competition", In International Conference on Machine Learning, 2018.
Bard, N., et al., "Online implicit agent modelling", In Proceedings of the 12th International Conference on Autonomous Agents and Multiagent Systems, 2013, 255-262.
Barrett, S. et al., "Teamwork with Limited Knowledge of Teammates", In Proceedings of the Twenty-Seventh AAAI Conference on Artificial Intelligence, 2013, 102-108.
Bengio, Y. et al., "Curriculum learning", In Proceedings of the 26th annual international conference on machine learning, 2009, 41-48. ACM.
Bowling, M. et al., "Multiagent learning using a variable learning rate", Artificial Intelligence, 2002, 136(2):215-250.
Watkins, J., "Learning from delayed rewards", Ph.D. Dissertation, King's College, Cambridge, UK, 1989.
Busoniu, L. et al., "A Comprehensive Survey of Multiagent Reinforcement Learning", IEEE Transactions on Systems, Man and Cybernetics, Part C (Applications and Reviews), 2008, 38(2): 156-172.
Camerer, C. F. et al., "Behavioural Game Theory: Thinking, Learning and Teaching", In Advances in Understanding Strategic Behavior, 2004,120-180.
Carmel, D., et al., "Opponent Modeling in Multi-Agent Systems", In IJCAI '95: Proceedings of the Workshop on Adaption and Learning in Multi-Agent Systems, 1995, Springer-Verlag.
Chalkiadakis, G., et al., "Coordination in Multiagent Reinforcement Learning: A Bayesian Approach", In Proceedings of the International Conference on Autonomous Agents, 2003, 709-716.
Tuyls, K., et al., "Multiagent learning: Basics, challenges, and prospects", AI Magazine, 2012, 33(3):41-52.
Foerster, J. N.et al., "Learning to communicate with deep multi-agent reinforcement learning", In Advances in Neural Information Processing Systems, 2016, 2145-2153.
Foerster, J. N.et al., "Stabilising Experience Replay for Deep Multi-Agent Reinforcement Learning", In International Conference on Machine Learning, 2017.
Foerster, J. N. et al., "Learning with Opponent-Learning Awareness", In Proceedings of 17th International Conference on Autonomous Agents and Multiagent Systems, 2018.
Gruslys, A. et al., "The reactor: A sample-efficient actor-critic architecture", arXiv preprint, 2017, arXiv:1704.04651.
He, H. et al., "Opponent modeling in deep reinforcement learning", In 33rd International Conference on Machine Learning, 2016, 2675-2684.
Heinrich, J., et al., "Deep Reinforcement Learning from Self-Play in Imperfect-Information Games", arXiv preprint, 2016, arXiv:1603.01121.
Henderson, P.; et al., "Deep Reinforcement Learning That Matters", In 32nd AAAI Conference on Artificial Intelligence, 2018.
Torrado, R. R. et al., "Deep Reinforcement Learning for General Video Game AI", arXiv preprint, 2018, arXiv:1806.02448.
Hong, Z.-W. et al., "A Deep Policy Inference Q-Network for Multi-Agent Systems", In International Conference on Autonomous Agents and Multiagent Systems, 2018.
Jaderberg, M. et al., "Population based training of neural networks", arXiv preprint, 2017, arXiv:1711.09846.
Tampuu, A. et al., "Multiagent Cooperation and Competition with Deep Reinforcement Learning", International Conference on Learning Representations, 2015.
Jaderberg, M. et al., "Human-level performance in firstperson multiplayer games with population-based deep reinforcement learning" arXiv preprint, 2018, arXiv:1807.01281.
Walsh, W. E. et al., "Analyzing complex strategic interactions in multi-agent systems", AAAI-02 Workshop on Game-Theoretic and Decision-Theoretic Agents, 2002, 109-118.
Lanctot, M. et al., "A Unified Game-Theoretic Approach to Multiagent Reinforcement Learning", In Advances in Neural Information Processing Systems, 2017.
Littman, M. L. "Markov games as a framework for multi-agent reinforcement learning", In Proceedings of the 11th International Conference on Machine Learning, 1994,157-163.
Mnih, V. et al., "Playing Atari with Deep Reinforcement Learning", arXiv preprint, 2013, arXiv:1312.5602v1.
Raileanu, R. et al., "Modeling Others using Oneself in Multi-Agent Reinforcement Learning", In International Conference on Machine Learning, 2018.
Rabinowitz, N. C. et al., "Machine Theory of Mind", In International Conference on Machine Learning, 2018.
Morav' c' k, M. et al., "Deep—Stack: Expert-level artificial intelligence in heads-up no-limit poker", Science 356, 2017, (6337):508-513.
Nagarajan, P. et al., "Deterministic implementations for reproducibility in deep reinforcement learning", arXiv preprint, 2018. arXiv:1809.05676.

* cited by examiner

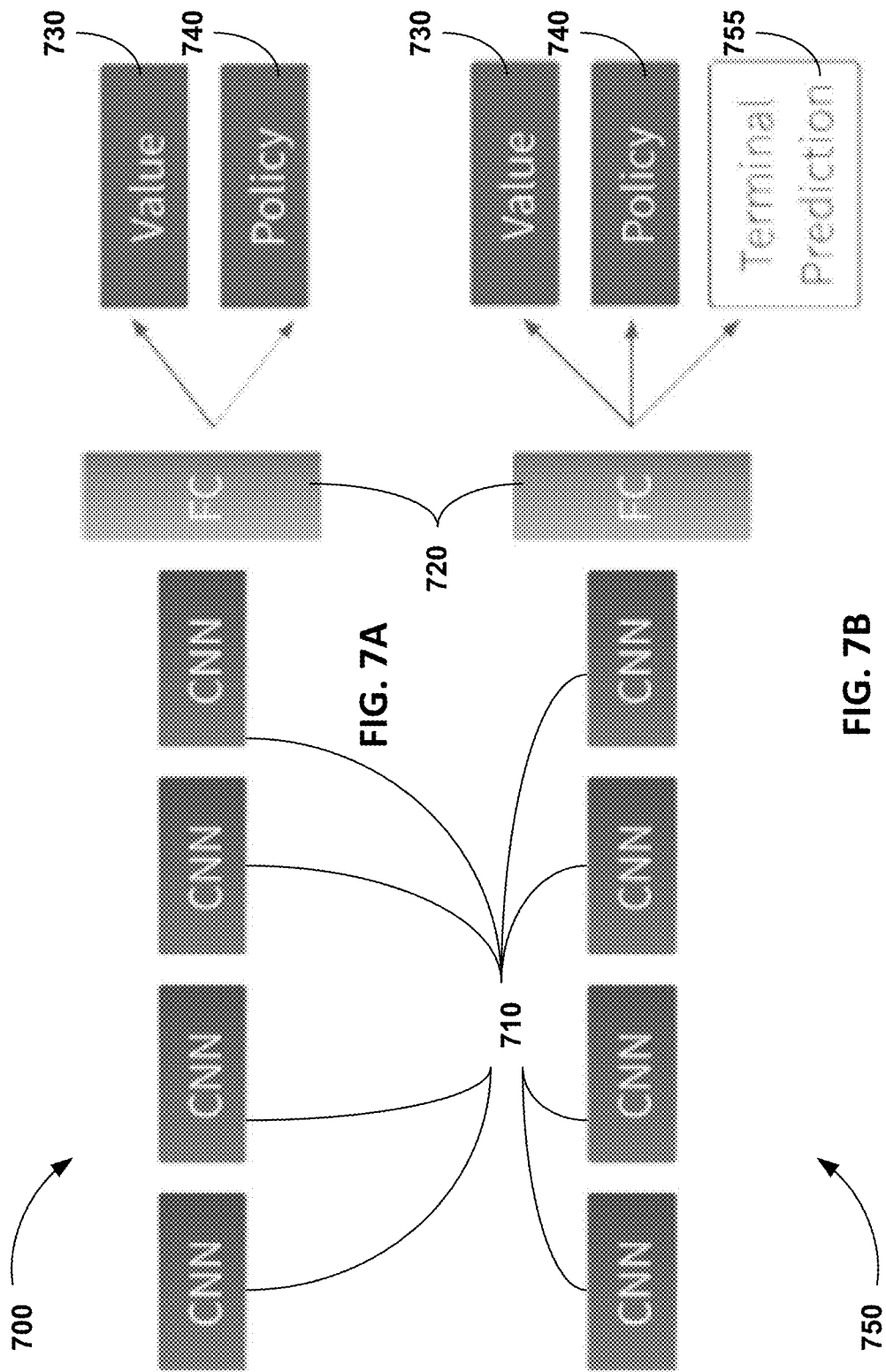

SYSTEM AND METHOD FOR DEEP REINFORCEMENT LEARNING

FIELD

The present disclosure generally relates to the field of machine learning, and in particular to a system and method for deep reinforcement learning.

INTRODUCTION

Deep reinforcement learning (DRL) combines reinforcement learning with deep learning, enabling better scalability and generalization for challenging (e.g., high-dimensional) domains. DRL has been one of the most active areas of research in recent years with great successes such as mastering Atari games from raw images, a GO playing agent skilled well beyond any human player (a combination of Monte Carlo tree search and DRL), and very recently great success in multi-agent games (e.g., DOTA 2 and Starcraft II). Reinforcement learning has also been applied for interactive narrative generation and learning companion Non-Player Character (NPC) behaviors.

One of the biggest challenges for reinforcement learning is sample efficiency. Once a DRL agent is trained, it can be deployed to act in real-time by only performing an inference through the trained model (e.g., via a neural network). However, pure planning methods such as Monte Carlo tree search (MCTS) do not have an offline training phase, but they perform computationally costly simulation based rollouts (assuming access to a simulator) to find the best action to take.

There are several ways to get the best of both DRL and search methods. AlphaGo Zero and the Expert Iteration technique concurrently proposed the idea of combining DRL and MCTS in an imitation learning framework where both components continuously improve each other. These works combine search and neural networks sequentially in a loop. First, search is used to generate an expert move dataset which is used to train a policy network. Second, this network is used to improve expert search quality. These two steps are repeated. However, expert move dataset collection by search algorithms can be slow in a sequential framework depending on the simulator which can render the training too slow.

Data hungriness of model-free reinforcement learning (RL) methods is only aggravated when the reward signals are sparse, delayed, or noisy. Standard RL problem formulations with non-linear function approximation (i.e., DRL) combine representation learning together with policy learning. In this case, the problem is further deepened when rewards are sparse since most of the collected experiences do not produce a learning signal for the agent, thus delaying representation learning for the environment. To address these issues, the concept of auxiliary tasks was introduced where an RL agent can learn from all experiences independent of external reward signals. Auxiliary tasks can be any task that the RL agent can predict and observe from the environment in a self-supervised fashion such as reward prediction, or predicting a game specific feature such as presence/absence of enemies in the current observation. Also note that auxiliary tasks are different from model-based RL where the learned model is used for planning. In contrast, auxiliary tasks were originally presented as hints that improved the network performance and learning time. In a minimal example of a small neural network it was shown that adding an auxiliary task effectively removed local minima. Thus, the auxiliary losses are expected to give more ambient gradients, not necessarily yield a generative model.

SUMMARY

In some embodiments, there is provided a computer system for extending parallelized asynchronous reinforcement learning to include terminal state prediction for training a neural network. The system comprises a data storage configured to store one or more data structures representing interconnected computing units of the neural network (including data fields storing weighted interconnections between the interconnected computing units), a plurality of hardware processors or threads of hardware processors, and a parallel processing controller configured for coordinated operation of the plurality of hardware processors or threads of hardware processors such that each functions as a worker agent that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment. The loss determination includes at least a policy loss term (actor), a value loss term (critic), and a terminal state prediction control loss.

In some embodiments, there is provided a computer system for extending parallelized asynchronous reinforcement learning to include planner imitation for training a neural network. The system comprises a data storage configured to store one or more data structures representing interconnected computing units of the neural network (including data fields storing weighted interconnections between the interconnected computing units), a plurality of hardware processors or threads of hardware processors, and a parallel processing controller configured for coordinated operation of the plurality of hardware processors or threads of hardware processors such that each functions as a worker agent that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment. The loss determination includes at least a policy loss term (actor), a value loss term (critic), and a planner imitation control loss.

In some embodiments, there is provided a computer implemented method for extending parallelized asynchronous reinforcement learning to include terminal state prediction for training a neural network. The method comprises maintaining one or more data structures representing interconnected computing units of the neural network (including data fields storing weighted interconnections between the interconnected computing units), and coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment. The loss determination function includes at least a policy loss term (actor), a value loss term (critic), and a terminal state prediction control loss.

In some embodiments, there is provided a computer implemented method for extending parallelized asynchronous reinforcement learning to include planner imitation for training a neural network. The method comprises maintaining one or more data structures representing interconnected computing units of the neural network (including data fields storing weighted interconnections between the interconnected computing units), and coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment. The loss determination function includes at least a policy loss term (actor), a value loss term (critic), and a planner imitation control loss.

In some embodiments, search may be blended with certain distributed DRL methods such that search and neural network components can be executed simultaneously. The expert (MCTS or other forward search methods) can be used as a demonstrator to speed up learning for model-free RL methods. Distributed RL methods enable efficient exploration and thus yield faster learning results and several such methods have been proposed.

In some embodiments, there is provided a computer system for action guidance via Monte Carlo tree set (MCTS)/demonstrations. In some embodiments, there is provided a computer system for blending search with distribution model-free DRL methods such that search and neural network components can be executed simultaneously in an on-policy fashion. In some embodiments, relatively weak demonstrators (e.g., lightweight MCTS with a small number of rollouts) for model-free RL by coupling the demonstrator and model-free RL through an auxiliary task that provides denser signals and more efficient learning with better exploration.

In some embodiments, there is provided a method for action guidance via MCTS/demonstrations. The method blends search with distribution model-free DRL methods such that search and neural network components can be executed simultaneously in an on-policy fashion. In some embodiments, relatively weak demonstrators (e.g., lightweight MCTS with a small number of rollouts) for model-free RL by coupling the demonstrator and model-free RL through an auxiliary task that provides denser signals and more efficient learning with better exploration.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 7A illustrates, in a component diagram, an example of a neural network architecture of an A3C actor-critic neural network architecture, in accordance with some embodiments;

FIG. 7B illustrates, in a component diagram, an example of a neural network architecture of an A3C-TP actor-critic neural network architecture, in accordance with some embodiments;

It is understood that throughout the description and figures, like features are identified by like reference numerals.

DETAILED DESCRIPTION

Figure 1A:
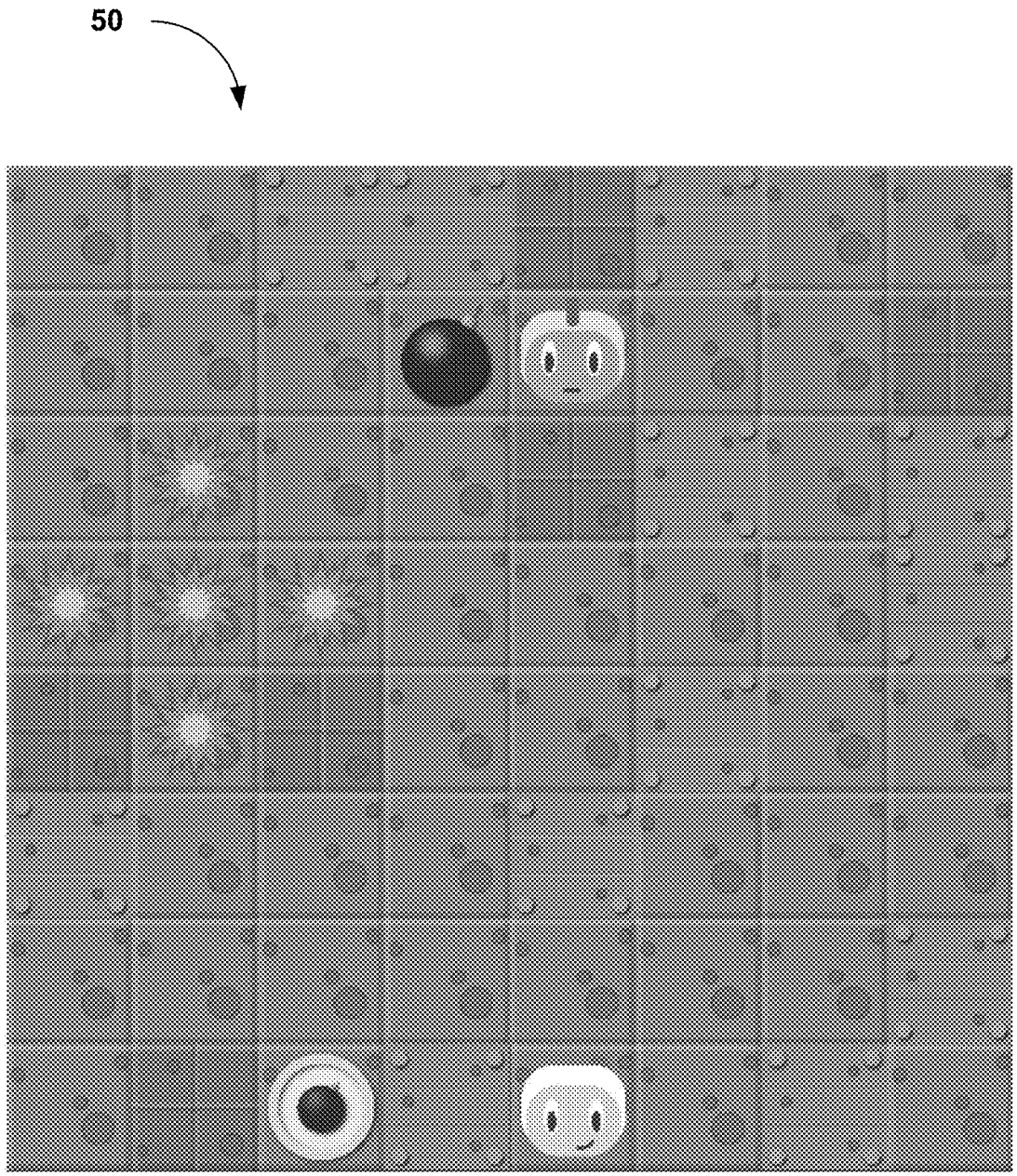
FIG. 1A illustrates, in a screenshot, an example of the Pommerman board size 8×8.

Embodiments of methods, systems, and apparatus are described through reference to the drawings.

Deep reinforcement learning (DRL) has achieved great successes in recent years. However, there are still several challenges to be addressed such as convergence to locally optimal policies and sample inefficiency (e.g., long training times). In some embodiments, action guidance may be used by means of a non-expert demonstrator to improve sample efficiency in a domain with sparse, delayed, and possibly deceptive rewards: the recently-proposed multi-agent benchmark of Pommerman. In some embodiments, there is provided a framework where even a non-expert simulated demonstrator, e.g., planning algorithms such as Monte Carlo tree search with a small number rollouts, can be integrated within asynchronous distributed deep reinforcement learning methods. Compared to a traditional deep RL algorithm, the methods described herein both learn faster and converge to better policies on a two-player mini version of the Pommerman game.

In some embodiments described herein, an Asynchronous Advantage Actor-Critic (A3C) method may be augmented with a self-supervising auxiliary task, e.g., Terminal Prediction, which measures temporal closeness to terminal states, namely A3C-TP, while learning control policies. Compared to A3C, the combined method both learns faster and converges to better policies when trained on a two-player mini version of the Pommerman game. Secondly, a new framework is proposed in some embodiments where planning algorithms, such as the Monte Carlo tree search, can be integrated as demonstrators within asynchronous distributed DRL methods to further speed up learning.

The recently proposed benchmark for (multi-agent) reinforcement learning: Pommerman is used to test embodiments described herein. This environment is based on the classic console game Bomberman. Pommerman is challenging game for many standard RL algorithms due its multi-agent nature and its delayed, sparse, and deceptive rewards.

Asynchronous Advantage Actor-Critic (A3C) may be considered as a baseline algorithm. In some embodiments, A3C may be augmented with different Auxiliary tasks, i.e., additional tasks that the agent can learn without extra signals from the environment besides policy optimization, to improve the performance of DRL algorithms.

In some embodiments, the auxiliary task of Action Guidance is used based on temporal closeness to terminal states on top of the A3C algorithm. The combined method, in some embodiments named PI-A3C, both learns faster and helps to converge to better policies when trained on a two-player mini version of Pommerman game, depicted in FIG. 1A.

In some embodiments, the auxiliary task of Terminal Prediction is used based on temporal closeness to terminal states on top of the A3C algorithm. The combined method, in some embodiments named A3C-TP, both learns faster and helps to converge to better policies when trained on a two-player mini version of Pommerman game, depicted in FIG. 1A.

FIG. 1A illustrates, in a screenshot, an example of the Pommerman board 50 size 8×8. The board is randomly generated by the simulator. Initial positions of the agents are randomized close to any of the four corners of the board (e.g., among four corners of each episode).

A new framework is also discussed below based on diversifying some of the workers of A3C method with MCTS based planners (serving as non-expert demonstrators) by using the parallelized asynchronous training architecture is provided. This has the effect of providing action guidance, which in turns improves the training efficiency measured by higher rewards.

Some embodiments pertain to the intersection of the research areas of deep reinforcement learning methods, imitation learning, and Monte Carlo tree search planning.

Reinforcement Learning (RL) seeks to maximize the sum of discounted rewards an agent collects by interacting with an environment. RL approaches mainly fall under three categories: value based methods such as tabular Q-learning or Deep-Q Network, policy based methods such as REINFORCE, and combination of value and policy based techniques, i.e., actor-critic RL methods. Recently, there have been several distributed actor-critic based DRL algorithms, including Asynchronous Advantage Actor Critic (A3C), Advantage Actor-Critic (A2C), UNREAL, Importance Weighted Actor-Learner Architecture (IMPALA), and Retrace-Actor (REACTOR).

A3C is an algorithm that employs a parallelized asynchronous training scheme (using multiple CPU threads) for efficiency. It is an on-policy RL method that does not use an experience replay buffer. A3C allows multiple workers to simultaneously interact with the environment and compute gradients locally. All the workers pass their computed local gradients to a global neural network that performs the optimization and synchronizes with the workers asynchronously.

The A2C method combines all the gradients from all the workers to update the global neural network synchronously.

Auxiliary tasks may improve representation learning in deep RL. For example, augmenting the RL agent with auxiliary tasks supports representation learning which provides richer training signals that enhance data efficiency. An auxiliary task may be added to a DRL agent in the Doom game; in particular, the agent may be trained to predict the presence/absence of enemies in the current observation. A model based DRL architecture based on Deep-Q-Network may predict: Q-values, next frame, rewards, and a binary terminal flag that predicts whether the episode will end or not. The terminal flag is (i) model-based, the prediction problem is formulated a classification problem. In contrast, the use of Terminal Prediction (TP) described herein (i) a TP is not model-based, and (ii) the prediction problem is formulated as a regression problem rather than classification, thus much more self-supervised signals that are automatically class-balanced are gathered (this is particularly useful for tasks with long episodes).

The UNREAL framework is built on top of A3C. In particular, UNREAL proposes unsupervised auxiliary tasks (e.g., reward prediction) to speed up the learning process which require no additional feedback from the environment. In contrast to A3C, UNREAL uses an ER buffer that is sampled with more priority given to interactions with positive rewards to improve the critic network. In particular, UNREAL proposes to learn a reward prediction based task besides a pixel-control based task to speed up learning by improving representation learning. In contrast to on-policy A3C, UNREAL uses an experience replay buffer that is sampled with more priority given to positively rewarded interactions to improve the critic network. In some embodiments described herein, the method, A3C-TP, differs from UNREAL in several ways: (i) the additional critic improvement step is not introduced—to better isolate the gain of the TP auxiliary task taught herein over vanilla/traditional A3C. (ii) Even though an auxiliary task is integrated, the resulting method is maintains on-policy with minimal refinements without an experience replay buffer which might require correction for stale experience data. (iii) UNREAL's reward-prediction requires class balancing of observed rewards in an off-policy fashion depending on the game reward sparsity and distribution whereas Terminal Prediction is balanced automatically, it can be applied within on-policy DRL methods, and it generalizes better for episodic tasks independently of the domain-specific reward distribution.

In the distributed architecture IMPALA, IMPALA actors communicate trajectories of experience (sequences of states, actions, and rewards) to a centralized learner, thus decoupling acting from learning.

REACTOR (Retrace-Actor) achieves better or similar performance in terms of rewards to other state-of-the-art methods, but it is more time efficient as it proposes and combines numerous algorithmic improvements, including distributed training architecture of asynchronous methods and sample efficiency off-policy methods.

Safe Reinforcement Learning (Safe RL) tries to ensure reasonable system performance and/or respect safety constraints during the learning and/or deployment processes. Roughly, there are two ways of doing safe RL: some methods adapt the optimality criterion, while others adapt the exploration mechanism. The description herein uses continuous action guidance of lookahead search with MCTS for better exploration.

Figure 2:
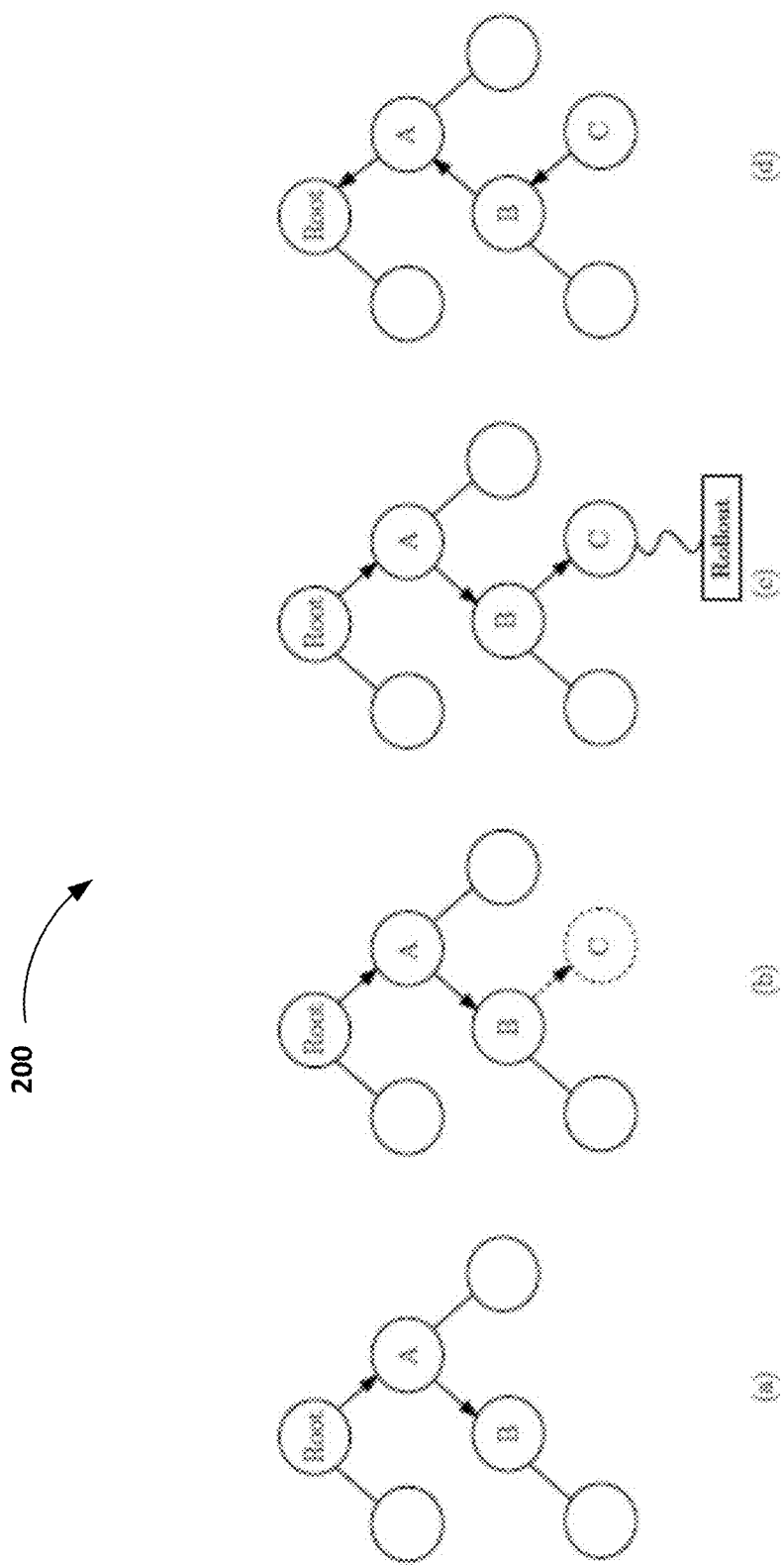
FIG. 2 illustrates, in a sequence of tree graphs, an example of a Monte Carlo Tree Search (MCTS), in accordance with some embodiments.

FIG. 2 illustrates, in a sequence of tree graphs, an example of a Monte Carlo Tree Search (MCTS) 200, in accordance with some embodiments. FIG. 2 illustrates and overview of MCTS. In step (a) selection, the UCB equation is used recursively until a node with an unexplored action is selected. Assume that nodes A and B are selected. In step (b) Expansion, node C is added to the tree. In step (c) Random Rollout, a sequence of random actions is taken from node C to complete the partial game. In step (d) Backpropagation, game after rollout terminates is evaluated and the score is back-propagated from node C to the root.

The MCTS is a best first search algorithm that gained traction after its breakthrough performance in Go. Other than for game playing agents, MCTS has been employed for a variety of domains such as robotics and procedural Sokoban puzzle generation.

The domains where rewards are delayed and sparse are difficult exploration RL problems, among the most challenging RL problems especially when learning tabula rasa. Imitation learning can be used to train agents much faster compared to learning from scratch.

Approaches such as DAGGER formulates the imitation learning as a supervised problem where the aim is to match the performance of the demonstrator. More recently, DAGGER is extended to work with continuous actions spaces and deep neural networks in a supervised learning fashion. However, performance of agents using these methods is upperbounded by the demonstrator performance.

However, some methods such as Expert Iteration extends imitation learning to RL setting where demonstrator is also continuously improved during training. There has been a growing body of work on imitation learning where human or simulated demonstrators' data is utilized to speed up policy learning in RL.

Previous research used demonstrator data by combining supervised learning loss with Q-learning loss within DQN algorithm to pretrain and showed that their method achieves good results on Atari games by using a few minutes of gameplay data to pretrain. Another previous research employed human demonstrators to pretrain their neural network in a supervised learning fashion to improve feature learning so that RL method with the pretrained network can focus more on the policy learning rather than feature learning. Their method shows significant improvement by reducing training time for several Atari games. Another research proposed the Learning from Demonstration (LfD) method where limited demonstrator data is used to impose constraints on the policy iteration phase and they theoretically prove bounds on the Bellman error during learning. Another recent work used planner demonstrations to learn a value function, which was then further refined with RL and a short-horizon planner for robotic manipulation tasks.

In some domains such as Robotics, the tasks can be dexterously hard or too much time consuming for humans to provide full demonstrations. Instead, humans can provide more sparse feedback on alternative agent trajectories that RL can use to speed up learning. Along this direction, one research proposed a method that constructs a reward function based on data containing human feedback with agent trajectories and showed that small amount of non-expert human feedback suffices to learn complex agent behaviours.

Planning and RL may be combined in such a way that RL can explore on the action space filtered down by the planner, outperforming using either solely a planner or RL. MCTS may be employed as a highlevel planner, which is fed a set of low-level offline learned DRL policies and refines them for safer execution within a simulated autonomous driving domain. RL, planning, and search may be unified.

AlphaGo defeated one of the strongest human Go players in the world. It uses imitation learning by pretraining RL's policy network from human expert games with supervised learning. Then, its policy and value networks keep improving by selfplay games via DRL. Finally, an MCTS search is employed where a policy network narrows down move selection (i.e., effectively reducing the branching factor) and a value network helps with leaf evaluation (i.e., reducing the number of costly rollouts to estimate state-value of leaf nodes).

The present disclosure differs from AlphaGo-like works in multiple aspects: (i) the present framework specifically aims to enable on-policy model-free RL methods to explore safely in hard-exploration domains where negative rewarding terminal states are ubiquitous, in contrast to off-policy methods which use intensive search to fully learn a policy; (ii) the present framework is general in that other demonstrators (human or other sources) can be integrated to provide action guidance by using the proposed auxiliary loss refinement; and (iii) the present framework aims to use the demonstrator with a small lookahead (i.e., shallow) search to filter out actions leading to immediate negative terminal states so that model-free RL can imitate those safer actions to learn to safely explore.

Other research used AlphaGo and AlphaGo Zero methods as they successfully combined methods from aforementioned research areas for a breakthrough success. AlphaGo defeated the strongest human GO player in the world on a full-size board. Indeed AlphaGo is a distributed pipeline that successfully combines imitation learning, MCTS, and DRL. It uses imitation learning by pretraining RL's policy network from human expert games with supervised learning. Then its policy and value networks keep improving by self-play games via RL. And finally, MCTS search skeleton is employed where a policy network narrows down move selection, i.e., effectively reducing branching factor, and a value network helps with leaf evaluation, i.e., reducing number of costly rollouts to estimate state-value of leaf nodes.

AlphaGo Zero dominated AlphaGo even though it started to learn tabula rasa, i.e., without using any human expert games. AlphaGo Zero still employed the skeleton of MCTS algorithm, but it did not perform rollouts to evaluate leaf states but only relied on the value network. This provides a significant gain in time-efficiency as the planning horizon can render rollouts highly demanding computationally. Also, AlphaGo Zero used a single neural network with value and policy heads similar to recent actorcritic methods whereas AlphaGo had two networks.

Reinforcement learning together with DQN algorithm details may be used to introduce deep reinforcement learning. Further description of A3C and UNREAL algorithms will also be provided.

A standard reinforcement learning setting comprises an agent interacting in an environment over a discrete number of steps. At time t the agent in state $s_t$ takes an action at and receives a reward $r_t$. The discounted return is defined as:

$$R_{t:\infty} = \Sigma_{t=1}^{\infty} \gamma^t r_t,$$

the state-value function is the expected return (sum of discounted rewards) from state s following a policy $\pi$ after taking action a from state s: $\pi(a|s)$:

$$V^\pi(s) = \mathbb{E}[R_{t:\infty}|s_t=s,\pi],$$

and the action-value function is the expected return following policy $\pi$ after taking action a from state s:

$$Q^\pi(s,a) = \mathbb{E}[R_{t:\infty}|s_t=s,a_t=a,\pi].$$

DQN algorithm approximates the action-value function $Q(s,a;\theta)$ using parameters, and then update parameters to minimize the mean-squared error, using the loss function:

$$L_Q(\theta_i) = \mathbb{E}[(r+\gamma \max_a Q(s',a';\theta_i^-) - Q(s,a;\theta_i))^2]$$

where $\theta^-$ represents the parameters of the target network that is held constant, but synchronized to the behaviour network $\theta^-=\theta$, at certain periods to stabilize learning.

A3C (Asynchronous Advantage Actor-Critic) is an algorithm that employs a parallelized asynchronous training scheme (e.g., using multiple CPUs) for efficiency; it is an on-policy RL method that does not need an experience replay buffer. A3C allows multiple workers to simultaneously interact with the environment and compute gradients locally. All the workers pass their computed local gradients to a global network which performs the optimization and synchronizes the updated actor-critic neural network parameters with the workers asynchronously. A3C method, as an actor critic algorithm, has a policy network (actor) and a value network (critic) where actor is parameterized by $\pi(a|s;\theta)$ and critic is parameterized by $V(s;\theta_v)$, which are updated as follows:

$$\Delta\theta = \nabla_\theta \log\pi(a_t | s_t; \theta)A(s_t, a_t; \theta_v),$$

$$\Delta\theta_v = A(s_t, a_t; \theta_v)\nabla_{\theta_v} V(s_t)$$

where, $$A(s_t, a_t; \theta_v) = \sum_{k}^{n-1} \gamma^k r_{t+k} + \gamma^n V(s_{t+n}) - V(s_t).$$

with $A(s, a) = Q(s, a) - V(s)$ representing the advantage function, commonly used to reduce variance.

The policy and the value function are updated after every $t_{max}$ actions or when a terminal state is reached. One softmax output may be used for the policy $\pi(a_t|s_t;\theta)$ head and one linear output for the value function $V(s_t;\theta_v)$ head, with all non-output layers shared (see FIGS. 7A and 7B). FIGS. 7A and 7B illustrate, in component diagrams, examples of a neural network architecture of an A3C 700 and A3C-TP 750 actor-critic neural network architecture, in accordance with some embodiments. The convolutional neural networks (CNNs) 710 shown represent convolutional neural network layers, and FC 720 represent a fully-connected layer. FIG. 7A shows a standard actor-critic neural network architecture 700 for A3C with policy (actor) 740 and value (critic) 730 heads. FIG. 7B shows the neural network architecture 750 of A3C-TP is identical to that of A3C, except with the additional auxiliary TP head 750.

The loss function for A3C is composed mainly of two terms: policy loss (actor), $$\mathcal{L}_\pi,$$

and value loss (critic), $$\mathcal{L}_v.$$

An entropy loss for the policy, $H(\pi)$, is also commonly added, which helps to improve exploration by discouraging premature convergence to suboptimal deterministic policies. Thus, the loss function is given by, $$\mathcal{L}_{A3C} \approx \mathcal{L}_v + \mathcal{L}_\pi \sim \mathbb{E}_{s\sim\pi}[\alpha H(\pi(s,\cdot,\theta))].$$

where in some embodiments, $\lambda_v=0.5$, $\lambda_\pi=1.0$, and $\lambda_H$ 0.01, being standard weighting terms on the individual loss components.

UNREAL is built on top of A3C. In particular, UNREAL proposes two unsupervised auxiliary tasks (e.g., reward prediction task where the agent predicts the next reward, which is observed in a self-supervised fashion) to speed up learning: auxiliary control and auxiliary prediction that share the previous layers that the base agent uses to act. By using this jointly learned representation, the base agent learns to optimize extrinsic reward much faster and, in many cases, achieves better policies at the end of training.

The UNREAL framework optimizes a single combined loss function with respect to the joint parameters of the agent, that combines the A3C loss, $$\mathcal{L}_{A3C},$$

together with an auxiliary control loss $$\mathcal{L}_{PC},$$

an auxiliary reward prediction loss $$\mathcal{L}_{RP}$$

and a replayed value loss $$\mathcal{L}_{VR}$$

as follows:

$$\mathcal{L}_{UNREAL}=\mathcal{L}_{A3C}+\lambda_{VR}\mathcal{L}_{VR}+\lambda_{PC}\mathcal{L}_{PC}+\lambda_{RP}\mathcal{L}_{RP}$$

Where $\lambda_{VR}$, $\lambda_{PC}$, and $\lambda_{RP}$ are weighting terms on the individual loss components.

In contrast to A3C, UNREAL uses an experience replay buffer that is sampled with more priority given to interactions with positive rewards to improve the critic network.

MCTS is a best-first search algorithm that gained traction after its breakthrough performance in Go. It has been used for many purposes, e.g., for game playing, for playtesting, and for robotics. In MCTS, a search tree is generated where each node in the tree represents a complete state of the domain and each link represents one possible valid action, leading to a child node representing the resulting state after taking an action. The root of the tree is the initial state (for example, the initial configuration of the Pommerman board including the agent location). MCTS proceeds in four phases of: selection, expansion, rollout, and backpropagation. The standard MCTS algorithm proceeds by repeatedly adding one node at a time to the current tree. Given that leaf nodes are likely to be far from terminal states, it uses random actions, a.k.a. rollouts, to estimate state-action values. The rollout policy can also be biased based on information obtained during search, or external domain knowledge. After the rollout phase, the total collected rewards during the episode is back-propagated through the tree branch, updating their empirical state-action values, and visit counts.

Choosing which child node to expand (i.e., choosing an action) becomes an exploration/exploitation problem given the empirical estimates. Upper Confidence Bounds (UCB1) is a bandit algorithm that is used for such settings with provable guarantees. Using UCB1 with MCTS is also referred to as Upper Confidence bounds applied to Trees (UCT). Applied to the framework of this disclosure, each parent node s chooses its childs' with the largest UCB1(s; a) value according to:

$$UCB1(s, a) = Q(s, a) + C\sqrt{\frac{\ln n(s)}{n(s')}}$$

Here, n(s) denotes number of visits to the node s and n(s') denotes the number of visits to s', i.e., the resulting child node when taking action a from node s. The value of C is a tunable exploration parameter.

Safer RL with MCTS Action Guidance

In some embodiments, a Planner Imitation—A3C (PI-A3C) framework 750 extends A3C with a lightweight search-based demonstrator through an auxiliary task based loss refinement as depicted in FIG. 7B. The framework 750 can use planners, or other sources of demonstrators, within asynchronous DRL methods to accelerate learning. Even though the framework 750 can be generalized to a variety of planners and DRL methods, MCTS and A3C are used for illustrative purposes. In particular, the UCB1 method is employed to balance exploration versus exploitation during planning. During rollouts, all agents are simulated as random agents as in vanilla/standard MCTS, and limited-depth rollouts are performed for time-constraints.

The motivation for combining MCTS and asynchronous DRL methods stems from the need to decrease training time, even if the planner or the simulator is very slow. In some embodiments, the demonstrator and actor-critic networks are decoupled, i.e., a vanilla UCT planner is used as a black-box that takes an observation and returns an action resembling UCTtoClassification method, which uses slower MCTS to generate an expert move dataset and trains a NN in a supervised fashion to imitate the search algorithm.

However, the UCTtoClassification method used a high-number of rollouts (10K) per action selection to construct an expert dataset. In contrast, the teachings herein may use vanilla MCTS with a small number of rollouts ($\approx$100) can still be employed in an on-policy fashion to improve training efficiency for actor-critic RL in challenging domains with abundant, easily reachable, terminal states with negative rewards. It should be noted that in Pommerman, 10K rollouts would take hours due to very slow simulator and long horizon.

Figure 3A:
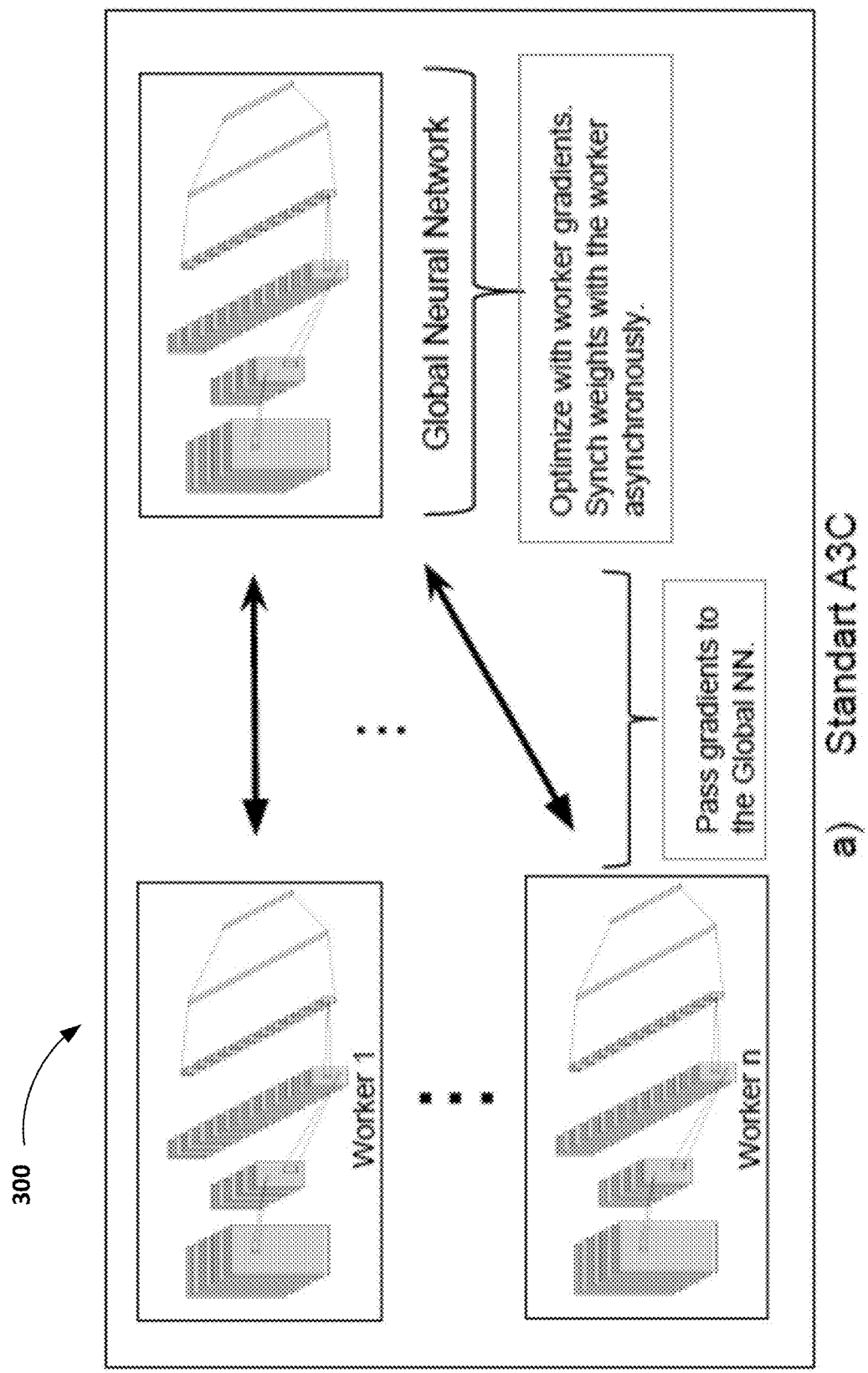
FIG. 3A illustrates an example of a standard A3C framework.

Within A3C's asynchronous distributed architecture, all the CPU workers perform agent-environment interactions with their policy networks, see FIG. 3A. In the PI-A3C framework 750, k$\geq$1 CPU workers are assigned (i.e., experiments are performed with different k values) to perform MCTS-based planning for agent-environment interaction based on the agent's observations, while also keeping track of how its policy network would perform for those cases, see FIG. 7. In this fashion, both imitating the MCTS planner and optimizing the policy are learned. The main motivation for the PI-A3C framework 750 is to increase the number of agent-environment interactions with positive rewards for hard-exploration RL problems to improve training efficiency.

Note that the planner-based worker still has its own neural network with actor and policy heads, but action selection is performed by the planner while its policy head is used for loss computation. In particular, the MCTS planner based worker augments its loss function with the auxiliary task of Planner Imitation. The auxiliary loss is defined as:

$$\mathcal{L}_{PI} = -\frac{1}{N}\sum_{i}^{N} a^i \log(\hat{a}^i),$$

which is the supervised cross entropy loss between $a^i$ and $\hat{a}^i$, representing the one-hot encoded action the planner used and the action the policy network would take for the same observation respectively during an episode of length N. The demonstrator worker's loss after the addition of Planner Imitation is defined by:

$$\mathcal{L}_{PI-A3C}=\mathcal{L}_{A3C}+\lambda_{PI}\mathcal{L}_{PI}$$

where $\lambda_{PI}$=1 is a weight term (which was not tuned). In PI-A3C non-demonstrator workers are left unchanged. By formulating the Planner Imitation loss as an auxiliary loss, the objective of the resulting framework becomes a multi-task learning problem where the agent learns to both maximize the reward and imitate the planner.

Terminal Prediction as an Auxiliary Task

In some embodiments, the Terminal Prediction (TP) is an auxiliary task. FIG. 7B shows an example of an A3C-TP neural network architecture 750. The main motivation is to equip the RL agent with the capability to predict a measure of temporal closeness to terminal states that are more likely to be reached under the agent's current policy.

For the proposed auxiliary task of Terminal Prediction, i.e., for each observation under the current policy, the agent predicts a temporal closeness value to a terminal state for the current episode under the agent's current policy. The neural network architecture of A3C-TP is identical to that of A3C, fully sharing parameters, with the exception of the additional terminal state 755 prediction head.

We compute the loss term for the terminal state prediction head, $$\mathcal{L}_{TP},$$

by using mean squared error between the predicted value of closeness to a terminal state of any given state (i.e., $y^p$) and the target values approximately computed from completed episodes (i.e., y) as follows:

$$\mathcal{L}_{TP} = \frac{1}{N}\sum_{i=0}^{N}(y_i - y_i^p)^2$$

where N represents the average length of previous episode lengths during training. We assume that the target for ith state can be approximated with $y_i$=i/N implying $y_N$=1 for the actual terminal state and $y_0$=0 for the initial state for each episode, and intermediate values are linearly interpolated between [0, 1].

The actual current episode length for N may be used to compute TP labels. However, this delays access to the labels until the episode is over, similar to observing an external reward signal only when the episode ends. Furthermore, it does not appear to provide significant improvement. To be able to have access to dense signals through our auxiliary task, running average of episode lengths computed from the most recent 100 episodes was used to approximate the actual current episode length for N. It was observed that the running average episode length does not abruptly change, but it can vary in correlation with the learned policy improvements. This approximation not only provides learning performance improvement, but also provides significant memory efficiency for distributed on-policy deep RL as CPU workers do not have to retain the computation graph, i.e., used within deep learning frameworks, until episode termination to compute terminal prediction loss.

Given $$\mathcal{L}_{TP},$$

the loss for A3C-TP may be defined as follows:

$$\mathcal{L}_{A3C-TP} = \mathcal{L}_{A3C} + \lambda_{TP}\mathcal{L}_{TP}$$

where $\lambda_{TP}$ is a weight term set to 0.5 from experimental results (presented below) to enable the agent to mainly focus on optimizing the policy. It should be understood that other weight terms may be used.

The hypothesis is that the terminal state prediction provides some grounding to the neural network during learning with a denser signal as the agent learns not only to maximize rewards but it can also predict approximately how close it is to the end of episode.

Approach Overview

In some embodiments, an A3C-Terminal Prediction (A3C-TP) extends A3C with an auxiliary task of terminal state prediction which outperforms pure A3C. In some embodiments, a framework may combine MCTS with A3C to accelerate learning.

For domains with sparse and delayed rewards, RL methods require long training times when they are dependant on purely the external reward signals. However, UNREAL method showed significant performance gains by extending A3C with additional tasks that are optimized in an off-policy manner by keeping an experience replay buffer. Changes may be made to A3C that complement A3C's loss with an auxiliary task, i.e. terminal state prediction, but still require no experience replay buffer and keep the modified method fully on-policy.

In some embodiments, a new auxiliary task of terminal state prediction is used, i.e., for each observation under the current policy, the agent predicts a temporal closeness metric to a terminal state for the current episode. The neural network architecture of A3C-TP is similar to that of A3C, fully sharing parameters, except the additional terminal state prediction head which outputs a value between [0, 1].

The loss term for the terminal state prediction head, $$\mathcal{L}_{TP},$$

may be determined by using mean squared error between the predicted probability of closeness to a terminal state of any given state, i.e. $y^p$ and the target values approximately computed from completed episodes, i.e. y, as follows $$\mathcal{L}_{TP} = \frac{1}{N}\sum_{i=0}^{N}(y_i - y_i^p)^2$$

where N represents the current episode length. The target for ith state can be approximated with $y_i$=i/N implying $y_N$=1 for actual terminal state and $y_0$=0 for initial state for each episode, and intermediate values are linearly interpolated between [0, 1].

Given $$\mathcal{L}_{TP}$$

computation, loss for A3C-TP may be defined as follows:

$$\mathcal{L}_{A3C-TP} = \mathcal{L}_{A3C} + \lambda_{TP}\mathcal{L}_{TP}$$

where $\lambda_{TP}$ is a weight term.

It is hypothesised that the terminal state prediction, as an auxiliary task, provides some grounding to the neural network parameters during learning as the agent learns not only to maximize rewards but it can also predict approximately how close it is to the end of episode, i.e., the moment where the reward signal will be available.

Figure 1B:
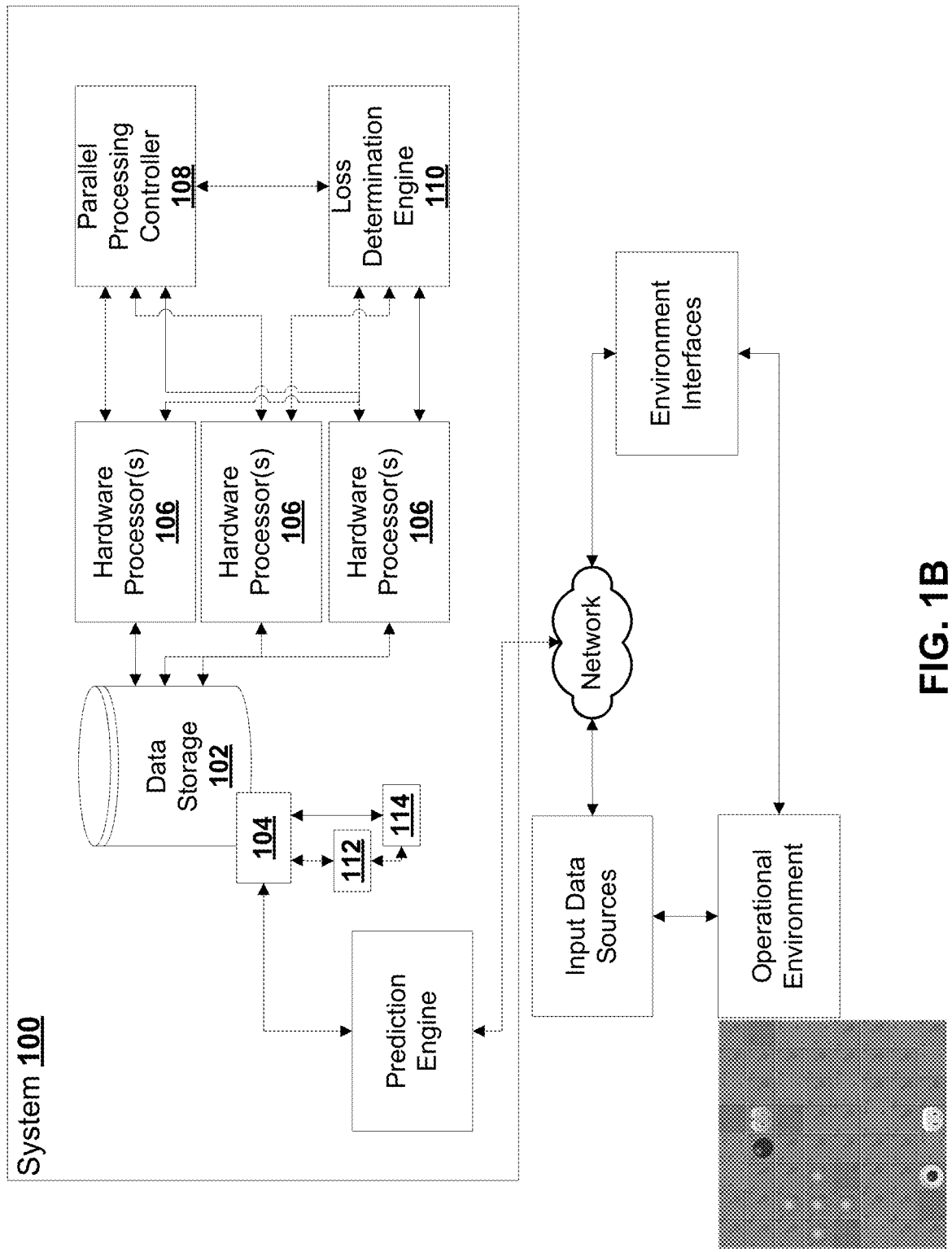
FIG. 1B is a block schematic of a computer system for extending parallelized asynchronous reinforcement learning to include action guidance and/or terminal prediction for training a neural network, in accordance with some embodiments.

FIG. 1B is a block schematic of a computer system for extending parallelized asynchronous reinforcement learning to include auxiliary tasks (such as action guidance and/or terminal prediction) for training a neural network, according to some embodiments.

Referring to FIG. 1B, the computer system 100, in some embodiments, is a computer server that can reside within a data center or a distributed set of networked computing resources (cloud implementation), and includes a data storage 102 configured to store one or more data structures representing interconnected computing units of the neural network 104, including data fields storing weighted interconnections between the interconnected computing units; a plurality of hardware processors or threads of hardware processors 106; and a parallel processing controller 108 configured for coordinated operation of the plurality of hardware processors or threads of hardware processors.

Figure 1C:
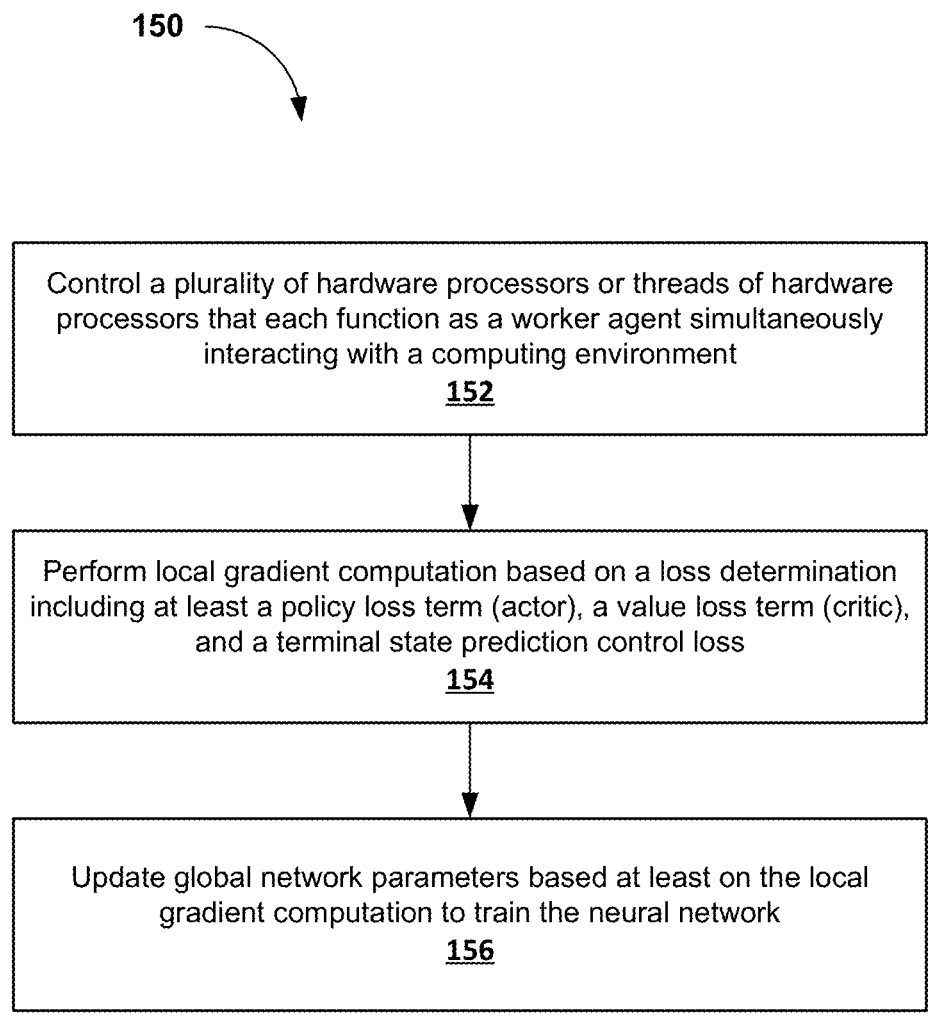
FIG. 1C illustrates, in a flowchart, an example of a computer implemented method for extending parallelized asynchronous reinforcement learning to include terminal state prediction for training a neural network, in accordance with some embodiments.

FIG. 1C illustrates, in a flowchart, an example of a computer implemented method for extending parallelized asynchronous reinforcement learning to include terminal state prediction for training a neural network 150, in accordance with some embodiments. The method 150 comprises controlling 152 a plurality of hardware processors or threads of hardware processors that each function as a worker agent simultaneously interacting with a computing environment.

In some embodiments, one or more data structures representing interconnected computing units of the neural network are maintained, including data fields storing weighted interconnections between the interconnected computing units. Next, a local gradient computation 154 is performed based on a loss determination including at least a policy loss term (actor), a value loss term (critic), and a terminal state prediction control loss. Next, global network parameters are updated 156 base at least on the local gradient computation to train the neural network. In some embodiments, operation of a plurality of hardware processors or threads of hardware processors are coordinated such that each functions as a worker process that is configured to simultaneously interact with a target computing environment for local gradient computation based on the loss determination function and to update global network parameters based at least on the local gradient computation to train the neural network through modifications of the weighted interconnections between the interconnected computing units as gradient computation is conducted across a plurality of iterations of the target computing environment.

Figure 1D:
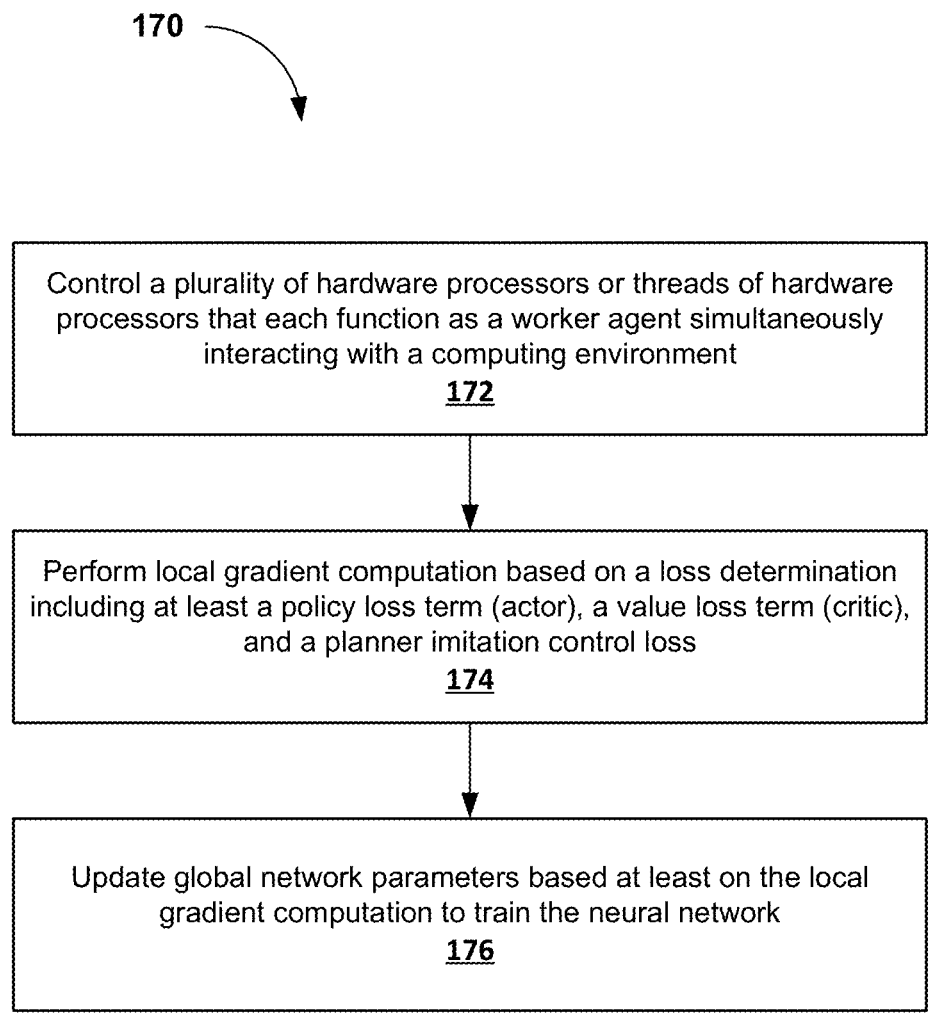
FIG. 1D illustrates, in a flowchart, an example of a computer implemented method for extending parallelized asynchronous reinforcement learning to include planner imitation for training a neural network, in accordance with some embodiments.

FIG. 1D illustrates, in a flowchart, an example of a computer implemented method for extending parallelized asynchronous reinforcement learning to include planner imitation for training a neural network 170, in accordance with some embodiments. The method 170 comprises controlling 172 a plurality of hardware processors or threads of hardware processors that each function as a worker agent simultaneously interacting with a computing environment. In some embodiments, one or more data structures representing interconnected computing units of the neural network are maintained, including data fields storing weighted interconnections between the interconnected computing units. Next, a local gradient computation 174 is performed based on a loss determination including at least a policy loss term (actor), a value loss term (critic), and a planner imitation control loss. Next, global network parameters are updated 176 based at least on the local gradient computation to train the neural network. In some embodiments, operation of a plurality of hardware processors or threads of hardware processors are coordinated such that each functions as a worker process that is configured to simultaneously interact with a target computing environment for local gradient computation based on the loss determination function and to update global network parameters based at least on the local gradient computation to train the neural network through modifications of the weighted interconnections between the interconnected computing units as gradient computation is conducted across a plurality of iterations of the target computing environment.

In some embodiments, a framework can use planners or other sources of simulated demonstrators along with asynchronous DRL methods to accelerate learning. Even though such a framework can be generalized to a variety of planners and distributed DRL methods, the description below showcases with MCTS and A3C methods. The motivation for combining MCTS and asynchronous DRL methods stems from the need to improve training time efficiency even if planner or world-model by itself is very slow. Inspired by the existing work on imitation learning, A3C is extended by reusing auxiliary tasks idea where the new auxiliary task becomes Planner Imitation along with optimizing policy.

Within A3C's asynchronous distributed architecture, all the CPU workers perform agent-environment interaction with their neural network policy networks. In the new framework, namely, Planner Imitation with A3C (PI-A3C), one CPU worker is assigned to perform MCTS based planning for agent-environment interaction based on the agent observations while also keeping track of what would its neural network would perform for those observations. In this fashion, it is learned to both imitate MCTS planner and optimize policy. One motivation for PI-A3C framework is to increase the number of agent-environment interactions with positive rewards for hard-exploration RL problems.

The planner based worker still has its own neural network with actor and policy heads, but action selection is performed by the planner while its policy head is utilized for loss computation. The rest of the workers are kept unchanged, still using policy head for action selection with the unchanged loss function. However, MCTS planner based worker augments its loss function with an auxiliary loss term, i.e., supervised imitation loss.

The loss for the auxiliary task of Planner Imitation, $$\mathcal{L}_{PI} = -\frac{1}{N}\sum_i^N a_o^i \log(\hat{a}_o^i)$$

is the supervised cross entropy loss between the one-hot encoded action planner used, $$a_o^i$$

and the action the actor (with policy head) would take in case there was no planner, $$\hat{a}_o^i$$

for an episode of length N:

$$\mathcal{L}_{PI\text{-}A3C} = \mathcal{L}_{A3C} + \lambda_{PI}\mathcal{L}_{PI}$$

where $\lambda_{PI}$ is a weight term.

The action guidance (i.e., planner imitation) and terminal state prediction auxiliary tasks may be used together. The loss for the combined auxiliary tasks of planner imitation and terminal state prediction $$\mathcal{L}_{PI\text{-}A3C\text{-}TP}$$

can be determined by adding the Terminal Prediction loss term to the Planner Imitation loss, i.e., adding $$\lambda_{TP}\mathcal{L}_{TP} \text{ to } \mathcal{L}_{PI\text{-}A3C}.$$

The use of MCTS may follow an approach which employs the Upper Confidence Bounds (UCB) technique to balance exploration vs. exploitation during planning. The MCTS algorithm has been described in FIG. 2. During rollouts, all agents may be simulated as random agents as in default unbiased MCTS. Truncated rollouts of length 20 may be performed to keep action-selection time at a reasonable time.

Experiments

The following will describe experiments and corresponding results.

The Pommerman two-player game was used in the experiments. The experimental setup and results were presented against different opponents.

FIG. 3A illustrates an example of a standard A3C framework 300. In the Asynchronous Advantage Actor Critic (A3C) framework 300, each worker independently interacts with the environment, collects experiences, and computes gradients locally. Then, each worker asynchronously passes the gradients to the global neural network which updates parameters and synchronize with the respective worker.

Figure 3B:
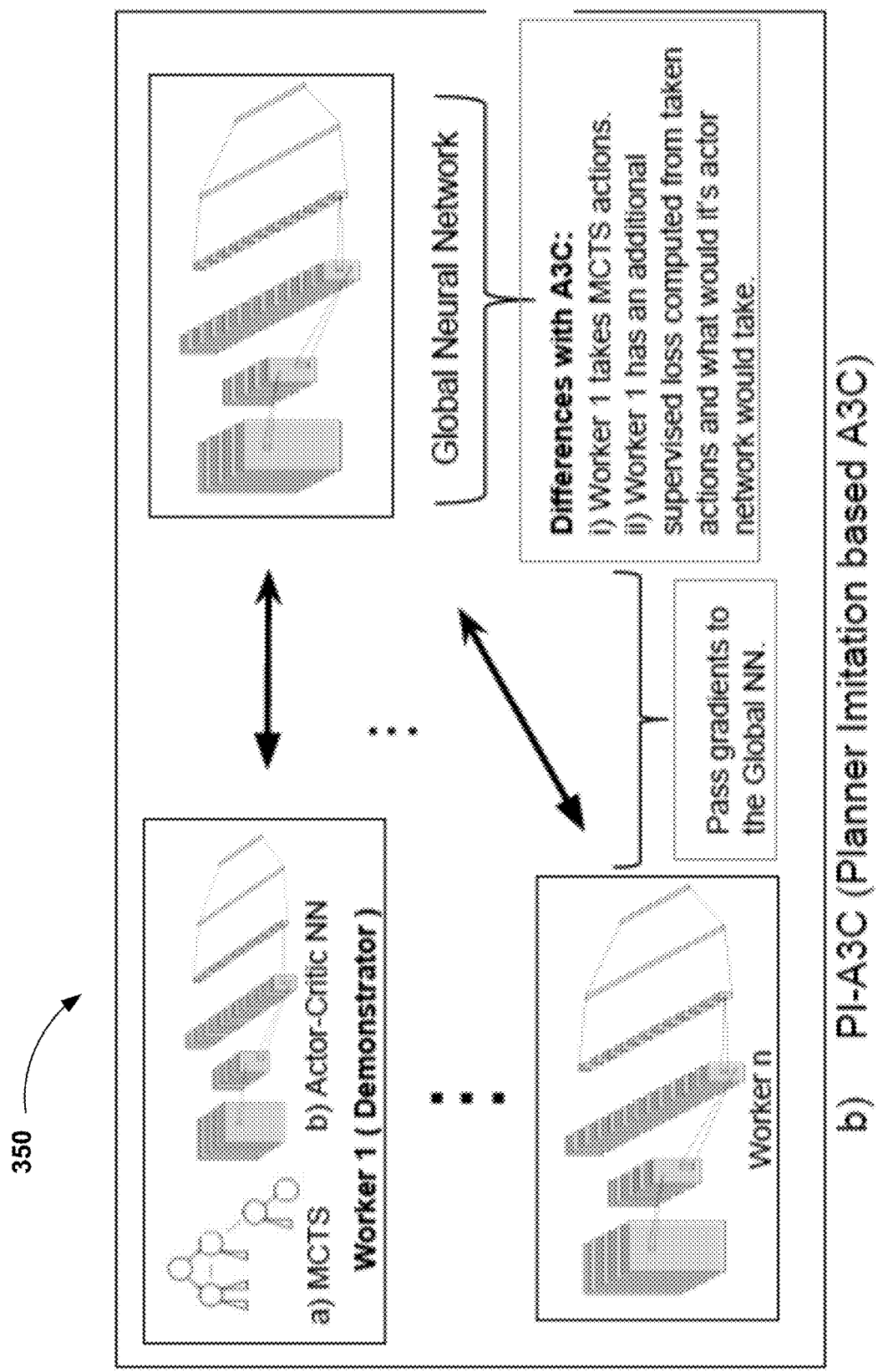
FIG. 3B illustrates an example of a Planner Imitation based A3C (PI-A3C) framework, in accordance with some embodiments.

FIG. 3B illustrates an example of a Planner Imitation based A3C (PI-A3C) framework 350, in accordance with some embodiments. In the Planner Imitation based A3C (PI-A3C) framework 350, one worker is assigned as an MCTS based demonstrator which takes actions MCTS suggests. However, it keeps track of what action its actor network would take. Demonstrator worker has an additional auxiliary supervised loss different than the rest of the workers. Rest of the workers kept unchanged. PI-A3C enables the network to simultaneously optimize the policy and learn to imitate the MCTS algorithm.

The Pommerman environment is based off of the classic console game Bomberman. Experiments herein use the simulator in a mode with two agents (see FIG. 1A). Each agent can execute one of six actions at every timestep: move in any of four directions, stay put, or place a bomb. Each cell on the board can be a passage, a rigid wall, or wood. The maps are generated randomly, albeit there is always a guaranteed path between any two agents. The winner of the game is the last agent standing and receives a reward of 1. Whenever an agent places a bomb it explodes after 10 timesteps, producing flames that have a lifetime of 2 timesteps. Flames destroy wood and kill any agents within their blast radius. When wood is destroyed either a passage or a power-up is revealed. Power-ups can be of three types: increase the blast radius of bombs, increase the number of bombs the agent can place, or give the ability to kick bombs. A single game of two-player Pommerman is finished when an agent dies or when reaching 800 timesteps.

Pommerman is a challenging benchmark for RL methods. The first challenge is that of sparse and delayed rewards. The environment only provides a reward when the game ends (with a maximum episode length of 800), either 1 or −1 (when both agents die at the same timestep they both get −1). A second issue is the randomization over the environment since tile locations etc. are randomized at the beginning of every game episode, as well as the initial positions of the agents. The game board keeps changing within each episode too due to disappearance of woods, and appearance/disappearance of tune-ups, flames, and bombs. The last complication is the multi-agent component. The agent needs to best respond to any type of opponent, but agents' behaviours also change based on the collected tune-ups, i.e., extra ammo, bomb blast radius, bomb kick ability. For these reasons, this game is considered rather challenging for many standard RL algorithms and a local optimum is commonly learned, i.e., not placing bombs.

The experiment employed a fully observable board configuration. The location of tiles are randomized for each episode. Also, the agents' initial locations are randomly chosen among four corners at each episode.

Ablation experiments may be run on the contribution of Planner Imitation to compare against the standard A3C method for: (i) single demonstrator with different expertise levels, (ii) different number of demonstrators with the same expertise level, and (iii) using rollout biasing within MCTS in contrast to uniform random rollout policy.

Two types of opponents were considered in the experiments: a Static opponent and a Rule-based opponent.

The Static opponent just waits in the initial position and always executes the 'stay put' action. This opponent provides the easiest configuration (excluding suicidal opponents). It is a baseline opponent to show how challenging the game is for model-free RL. The Rule-based opponent is a baseline agent within the simulator, namely SimpleAgent. It collects power-ups and places bombs when it is near an opponent. It is skilled in avoiding blasts from bombs. It uses Dijkstra's algorithm on each timestep, resulting in longer training times.

All training curves are obtained from 3 runs with different random seeds. From these 3 separate runs, average learning performance and standard deviations were determined. At every training episode, the board is shuffled. Because of all the complexities mentioned in this domain it was simplified by considering a game with only two agents and a reduced board size of 8×8 (see FIG. 1). Note that the location of walls, wood, power-ups, and the initial position of the agents for every episode were randomized.

Other games were tested with respect to TP. Six Atari games (with discrete actions), and the BipedalWalker domain (with continuous actions) were also tested in addition to Pommerman (with discrete actions and two different opponents). In all cases, both standard A3C and A3C-TP were trained with 3 different random seeds. For Atari games and the Bipedal-Walker domain, 8 CPU workers were employed. Note the Pommerman domain used 24 CPU workers as Pommerman is very challenging for model-free RL.

Experiments were conducted using OpenAI Gym using sticky actions and stochastic frame-skipping. Reward scaling was not performed across the games so that agents can distinguish the reward magnitudes rather than just being rewarded with +1 or −1.

The Atari benchmark provides several games with diverse challenges that render different methods more successful in different subset of games, e.g., the game Frostbite is mastered by DQN, but A3C performs poorly on it. Thus, a small but diverse set of games with varying difficulties were selected for computational cost reasons. The selected games are: Pong, Breakout, CrazyClimber, Q*bert, BeamRider, and SpaceInvaders. The first 3 games are simpler games where dense reward signals are ubiquitous and reactive strategies learned by the RL method provide high rewards to progress the policy learning; Q*bert, Seaquest, and Space-Invaders are relatively harder as longer term non-reactive strategies are needed. The BipedalWalker, which takes only a few hours to train on a standard laptop, was also used. The main difference of this domain is that it is a continuous action-space one.

For Atari and BipedalWalker domains, the NN architecture uses 4 convolutional layers where the first two have 32 filters with a kernel size of 5×5, and the remaining ones have 64 filters with a stride and padding of 1 with a filter size of 4×4 and 3×3. This is followed with an LSTM layer with 128 units leading to standard actor-critic heads along with the Terminal Prediction head 755. For Pommerman, the NN architecture similarly uses 4 convolutional layers, each of which has 32 filters and 3×3 filters with a stride and padding size of 1, followed with a fully connected layer with 128 hidden units which leads to the three output heads. For both domains, the Adam optimizer was employed with a learning rate of 0.0001. Neural network architectures were not tuned.

For Atari games, the visual input is fed to the NN as an input whereas in Pommerman, 22 feature maps that are constructed from the agent observation are maintained. These feature channels maintain location of walls, wood, powerups, agents, bombs, and flames. Agents have different properties such as bomb kick, bomb blast radius, and number of bombs. Three feature maps were maintained for these abilities per agent. A feature map for the remaining lifetime of flames was also maintained.

Results

Comparisons of the proposed methods will be presented based on the training performance in terms of converged policies and time-efficiency against Static and Rule-based opponents.

Results for A3C and A3C-TP will now be compared.

Figure 4A:
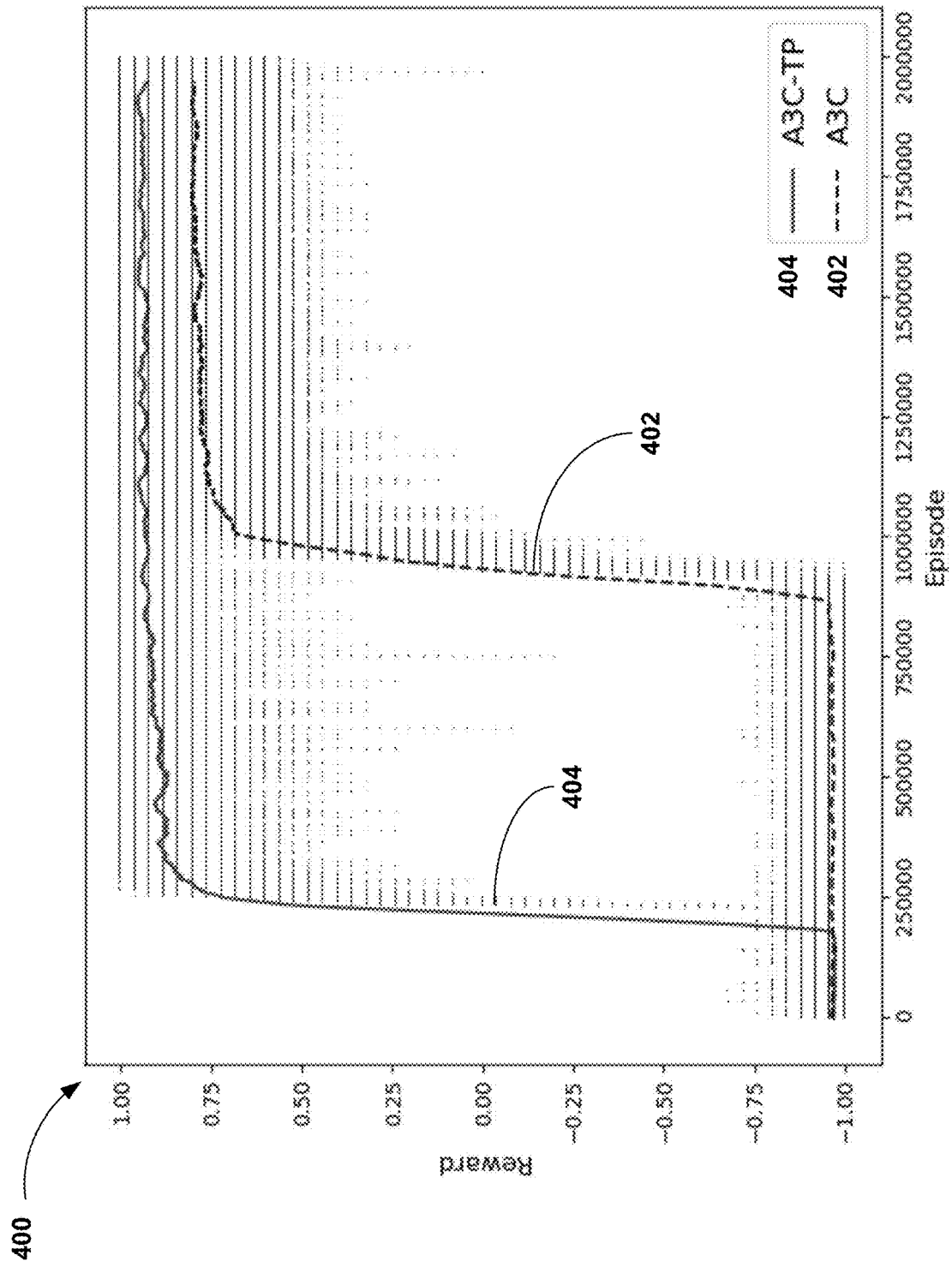
FIG. 4A illustrates, in a graph, an example of learning against a Static opponent, in accordance with some embodiments.

FIG. 4A illustrates, in a graph, an example of learning against a Static opponent 400, in accordance with some embodiments. The A3C-TP method 404, outperforms the standard A3C method 402 in terms of both sample-efficiency and converging to a better policy. Both approaches were trained for nearly 6 hours.

The training results for A3C 402 and the proposed, A3C-TP 404, against a Static opponent are shown in FIG. 4A. The A3C-TP 404 approach both converges much faster, and to a better policy compared to the standard A3C 402. Static opponent is the simplest possible opponent ignoring suicidal opponents for Pommerman game as it provides a more stationary environment for RL methods. Trained agent needs to learn to successfully place a bomb near the enemy and stay out of death zone due to upcoming flames. The other nice property of Static opponent is that it does not commit suicide, thus there is no false positives in observed positive rewards even though there are false negatives due to our agent's possible suicides during training.

Figure 5A:
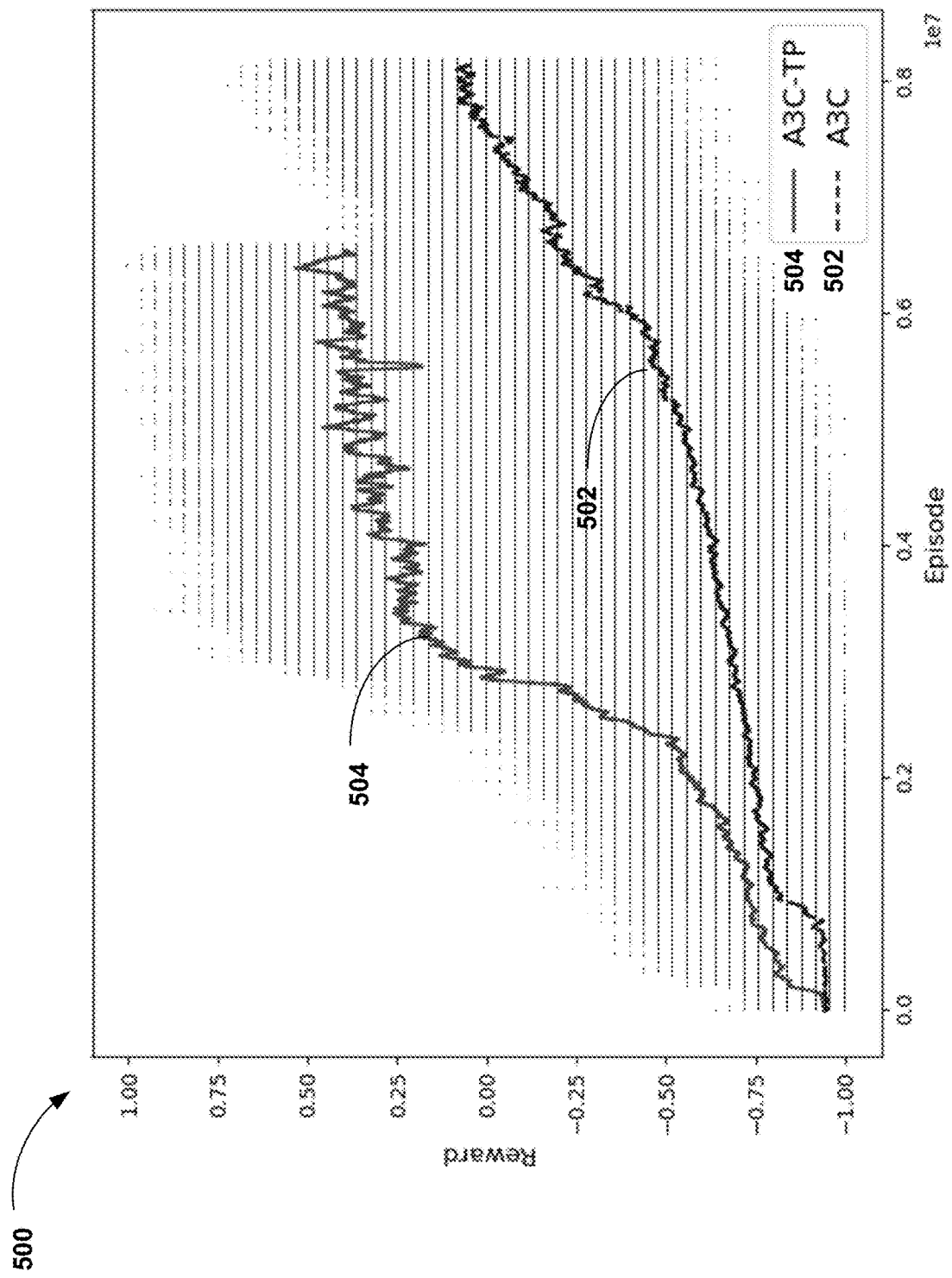
FIG. 5A illustrates, in a graph, an example of learning against a Rule-based opponent, in accordance with some embodiments.

FIG. 5A illustrates, in a graph, an example of learning against a Rule-based opponent 500, in accordance with some embodiments. The A3C-TP method 504, outperforms the standard A3C method 502 in terms of both sample-efficiency and finding a better policy. Both approaches were trained for 3 days. Rule-based agent uses Dijkstra's algorithm at each timestep resulting in longer training times.

A3C and A3C-TP were also trained against a Rule-based opponent for 3 days. The results are presented in FIG. 5A showing that the A3C-TP method 504 learns faster and it found a better policy in terms of average rewards. Training against Rule-based opponent takes much longer time. There is an additional challenge of false positives compared to Static opponent that can come from opponent's suicides in which case our agent gets a +1 without any reasonable behaviour besides not committing suicide itself. Rule-based agent's behaviour is stochastic, and based on the tune-ups it collected, its behaviour can further change. For example, if it collected several ammo tuneups, it can place too many bombs that might create chain explosions in complex ways.

FIG. B illustrates, in a graph, an example of learning against a static agent 450, in accordance with some embodiments. Against Static agent, all variants have been trained for 12 hours. The PI-A3C framework using MCTS demonstrator with 75 454 and 150 456 rollouts learns significantly faster compared to the standard A3C 452.

Figure 5B:
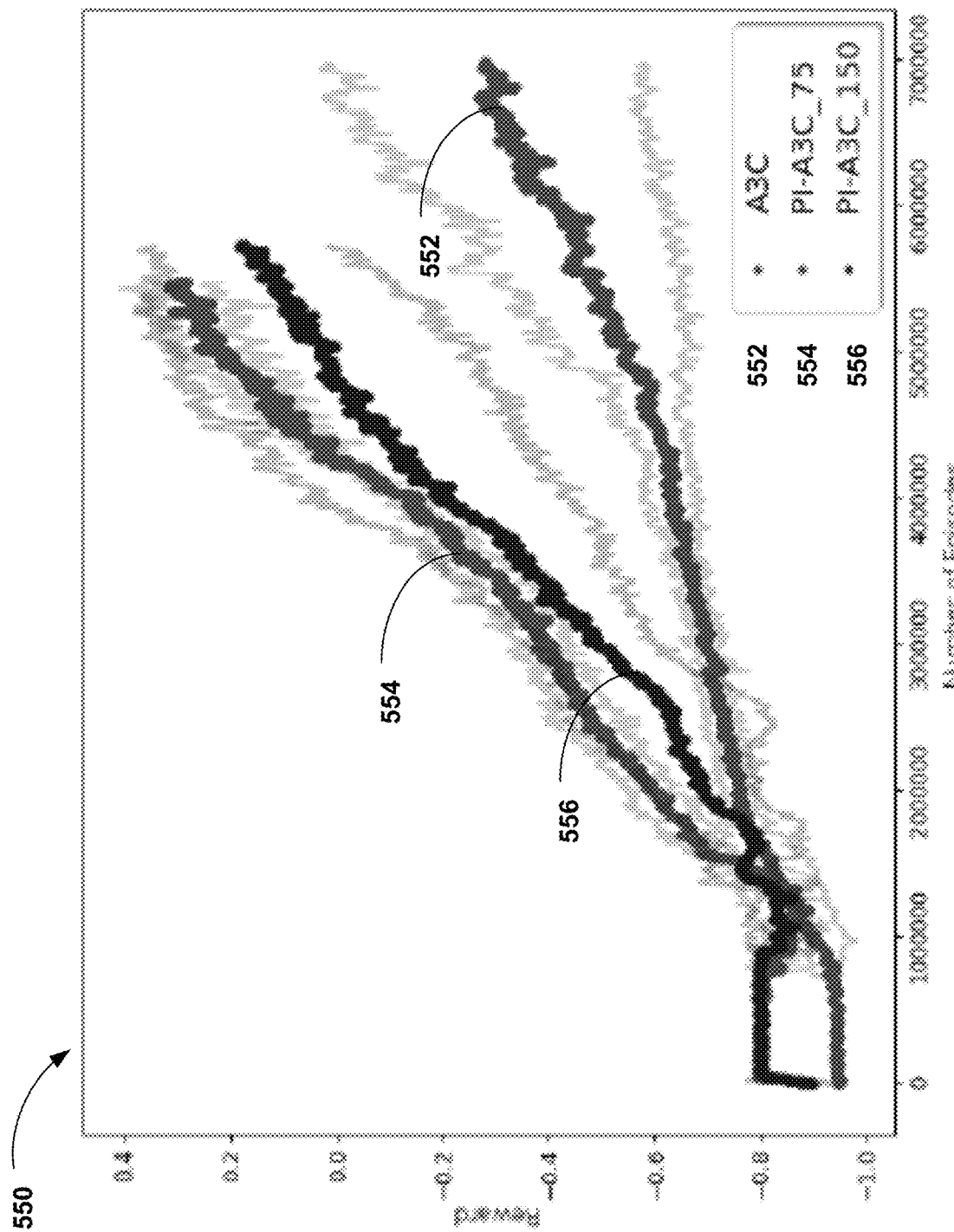
FIG. 5B illustrates, in a graph, an example of learning against a Rule-based agent, in accordance with some embodiments.

FIG. 5B illustrates, in a graph, an example of learning against a rule-based agent 550, in accordance with some embodiments. Against Rule-based opponent, all variants have been trained for 3 days. Against this more skilled opponent, PI-A3C 554, 556 provides significant speed up in learning performance, and finds better best response policies. It is observed that increasing the expertise level of MCTS through doubling the number of rollouts (from 75 to 150) does not yield improvement, and can even hurt performance. This may be because slower planning decreases the number of demonstrator actions too much for the model-free RL workers to learn to imitate for safe exploration.

Figure 4B:
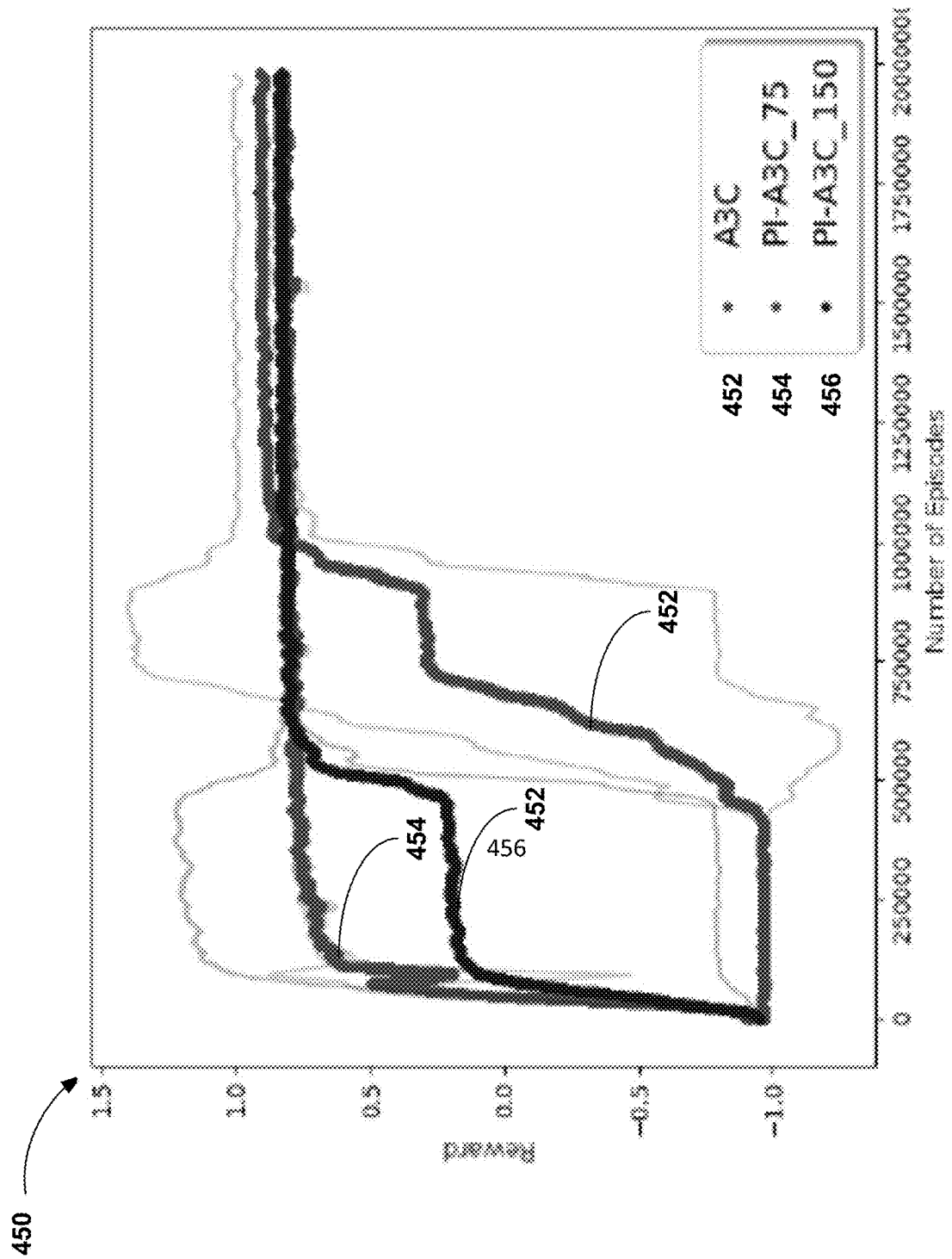
FIG. 4B illustrates, in a graph, an example of learning against a Static agent, in accordance with some embodiments.

The expertise level of MCTS by may be varied by simply changing the number of rollouts. The experiment included 75 and 150 rollouts. Given finite training time, higher rollouts imply deeper search and better moves, however, it also implies that number of guided actions by the demonstrators will be fewer in quantity, reducing the number of asynchronous updates to the global neural network. As FIGS. 4B and 5B show, the relatively weaker demonstrator (75 rollouts) enabled faster learning than the one with 150 rollouts against both opponents. The Vanilla-MCTS performance was also measured against both opponents as reported in Table 1. The results show that average rewards increase when given more rollouts against both opponents. Against static opponents, Vanilla-MCTS performance is worse than both A3C 452 and PI-A3C 454, 456 methods. This occurs because even when vanilla-MCTS does not commit suicides often, it fails to blast the opponent, resulting in too many tie games (episodic reward of −1). In contrast, PI-A3C makes use of the demonstrator for safer exploration with higher-quality atomic actions and learns to explore faster than A3C. Against a more challenging Rule-based opponent, pure MCTS (mean episodic reward of −0.23 using 75 rollouts) is slightly better than pure A3C (mean episodic reward of −0.27), however PI-A3C with either 75 or 150 rollouts combines both approaches well and perform the best (see FIG. 5B).

TABLE 1

Vanilla MCTS-based demonstrator evaluation: average episodic rewards of 200 games.

| Vanilla-MCTS vs. | Static | Rule-based |
| --- | --- | --- |
| 75 Rollouts | −0.12 | −0.23 |
| 150 Rollouts | −0.08 | −0.20 |

Note that mean rewards may be affected by too many tie games (rewarded −1 by the Pommerman simulator), e.g., against Static opponent, MCTS wins 88 games, loses 4 games by suicide, and ties 108 games, which results in average reward of −0.12.

It appears that the faster demonstrator (MCTS with only 75 rollouts) makes more updates to the global neural network, warming up other purely model-free workers for safer exploration earlier in contrast to the slower demonstrator. This is reasonable as the model-free RL workers constitute all but one of the CPU workers in these experiments, therefore the earlier the model-free workers can start safer exploration, the better the learning progress is likely to be. Even though MCTS was used with fixed number of rollouts, this could be set dynamically, for example, by exploiting the reward sparsity or variance specific to the problem domain, e.g., using higher number of rollouts when close to bombs or opponents.

Figure 5C:
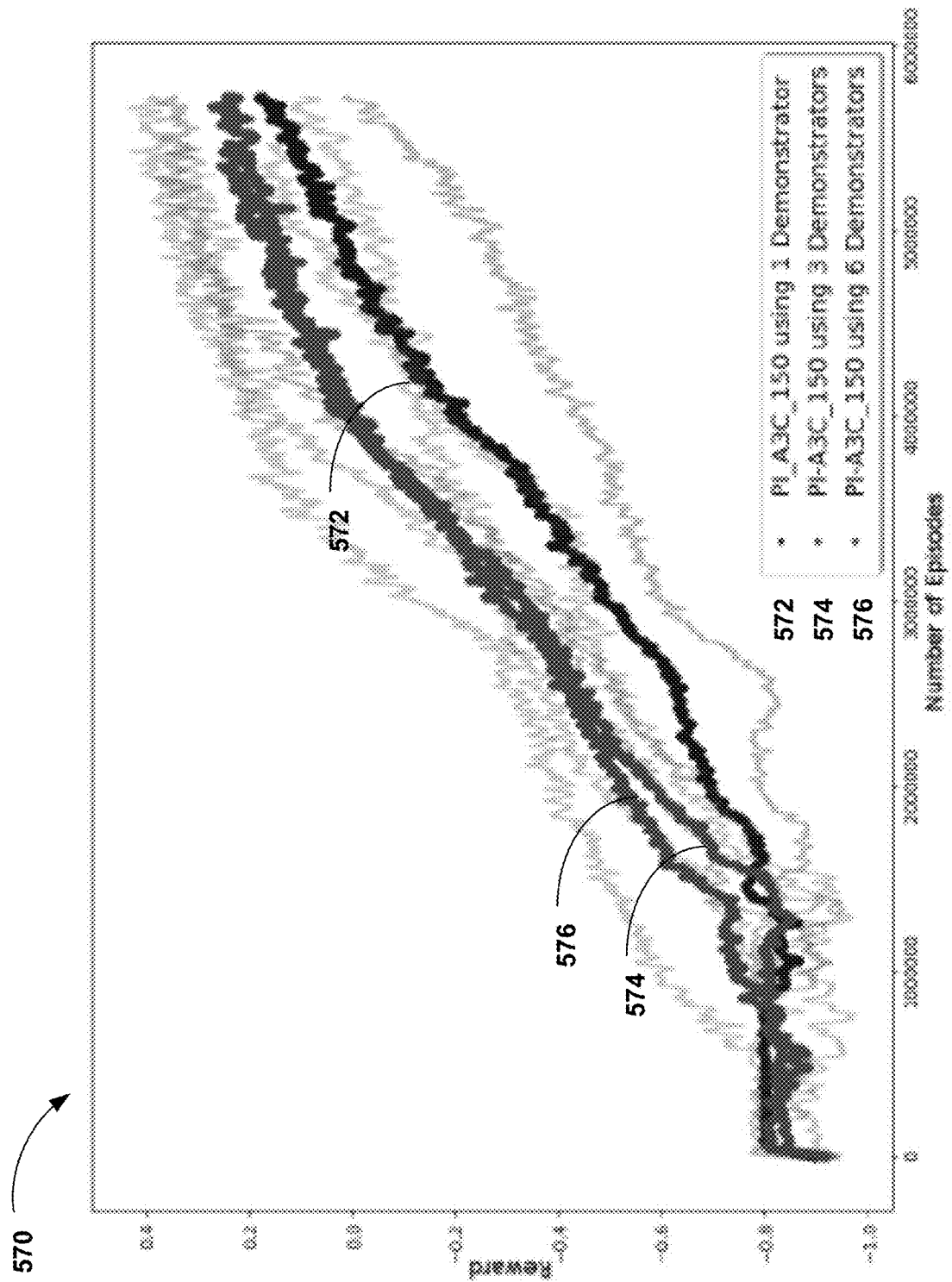
FIG. 5C illustrates, in a graph, an example of learning against a varied number of demonstrators, in accordance with some embodiments.

FIG. 5C illustrates, in a graph, an example of learning against a rule-based opponent employing a varied number of demonstrators 570, in accordance with some embodiments. Against Rule-based opponent, employing different number (n=1, 3, 6) of Demonstrators, i.e. increasing from 1 to 3, slightly improved the results. However, there is almost no variation from 3 to 6 demonstrators. The proposed method is built on top of an asynchronous distributed framework that uses several CPU workers: $k \geq 1$ act as a demonstrator and the rest of them explore in model-free fashion. One experiment was conducted to better understand how increasing the number of demonstrators, each of which provides additional Planner Imitation losses asynchronously, affects the learning performance. The trade-off is that more demonstrators imply fewer model-free workers to optimize the main task, but also a higher number of actions to imitate. The results in FIG. 5C were based on 3 and 6 demonstrators, with identical resources and with 150 rollouts each. Results show that increasing to 3 improves the performance while extending to 6 demonstrators does not provide any marginal improvement.

The 3 demonstrator version using 150 rollouts presented in FIG. 5C has a relatively similar performance with the 1 demonstrator version using 75 rollouts (see FIG. 5B), which is aligned with the hypothesis that providing more demonstrator guidance early during learning is more valuable than fewer higher quality demonstrations.

Figure 6A:
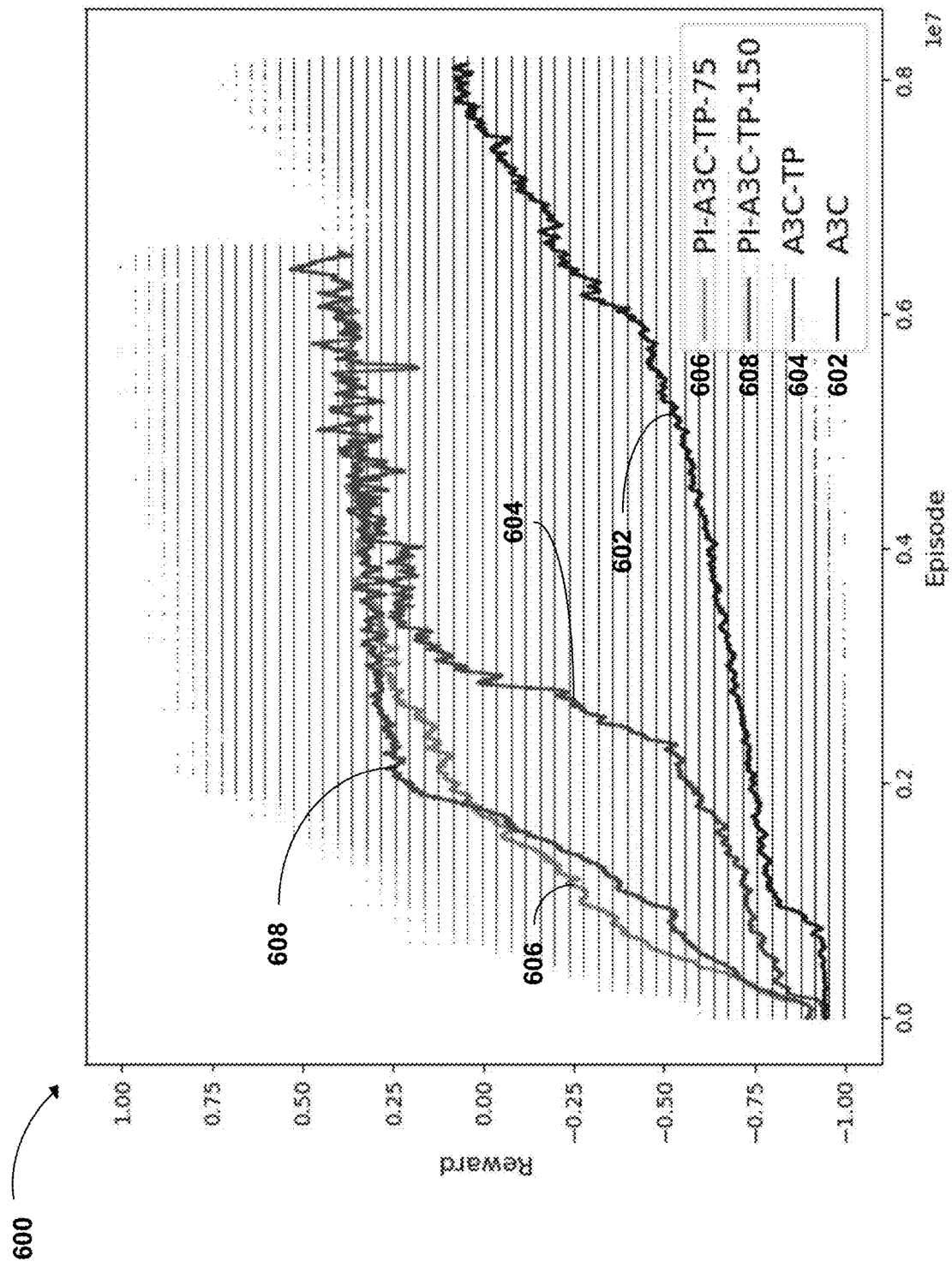
FIG. 6A illustrates, in a graph, an example of learning against a Rule-based opponent, in accordance with some embodiments.

Another experiment performed was to compare the A3C-TP method with a PI-A3C-TP method, i.e., a further extension of A3C-TP with the Planner Imitation framework against a Rule-based opponent. FIG. 6A illustrates, in a graph, learning against a Rule-based opponent 600, in accordance with some embodiments. In the IM-A3C-TP framework, an MCTS planner worker was used for 75 606 and 150 608 rollouts, provides faster learning compared to standard A3C 602 and A3C-TP 604. All approaches were trained for 3 days. For IM-A3C-TP results, curves are obtained by using only neural network policy network based workers, excluding MCTS based worker.

The results presented in FIG. 6A show that PI-A3C-TP 606, 608 learns faster than both A3C-TP 604 and the standard A3C 602. The expertise level of MCTS may be varied by changing the number of rollouts per action-selection. The experiment used 75 606 and 150 608 rollouts per move.

There is a trade-off in increasing the expert skill by increasing the planning time through rollouts, i.e., the slower the planner, the less asynchronous update will be made to the global neural network by the planner based worker compared to the rest of the workers that purely use neural network policy head to act.

An hypothesis was that PI-A3C-TP with 75 rollouts 606 learns faster as its MCTS based worker can make more updates to the global neural network, better warming-up the rest of the workers compared to the 150 rollout 608 variant. However, PI-A3C-TP with 150 rollouts 608 outperforms the rest around 2 million (M) episodes as its global neural network is updated (even though fewer times than 75 rollout 606 variant) to imitate a higher skilled planner.

Figure 6B:
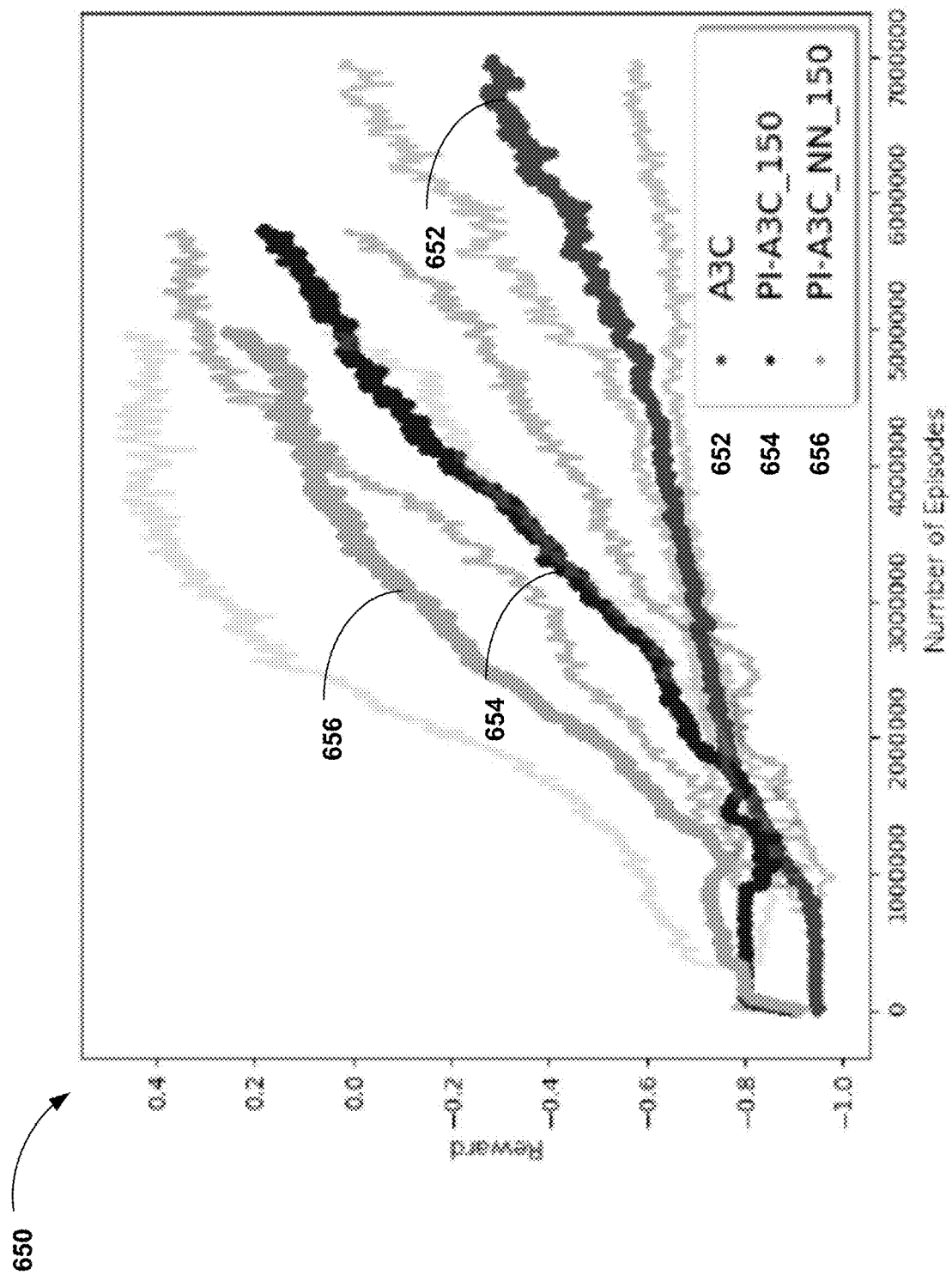
FIG. 6B illustrates, in a graph, another example of learning against a Rule-based opponent, in accordance with some embodiments.

FIG. 6B illustrates, in a graph, learning against a Rule-based opponent 650, in accordance with some embodiments. Using the policy head during MCTS rollout phase within the demonstrator provides improvement in learning speed, but it 654 has higher variance compared to the default random policy 652. Uniform random rollouts employed by MCTS yield unbiased estimates. However it requires a high number of rollouts to reduce the variance. One way to improve search efficiency has been through different biasing strategies, such as prioritizing actions globally based on their evaluation scores, using heuristically computed move urgency values, or concurrently learning a rollout policy. In a similar vein with these methods, the MCTS-based demonstrator was allowed to access the policy head during rollouts, named as PI-A3C-NN (Planner Imitation—A3C with Neural Network) 656. The results suggest that employing a biased rollout policy improves in the average learning performance. However it has higher variance, as depicted in FIG. 6B.

Initial attempts to adapt DQN and DRQN to Pommerman were made, but they did not learn any reasonable behaviour, besides coward strategies where the agents learn to never place a bomb.

In one embodiment, MCTS was adapted as a standalone planner without any neural network component for game playing. This played relatively well against Rule-based opponent, but the computation time for each move was well beyond the allowed decision time which is 100 milliseconds (ms).

A sensitivity analysis on the Terminal Prediction loss weight term will be presented. Then, training results for both Atari and Pommerman domains to ablate the contribution of the proposed method, i.e., A3C-TP, against the standard A3C will be shown.

Figure 8A:
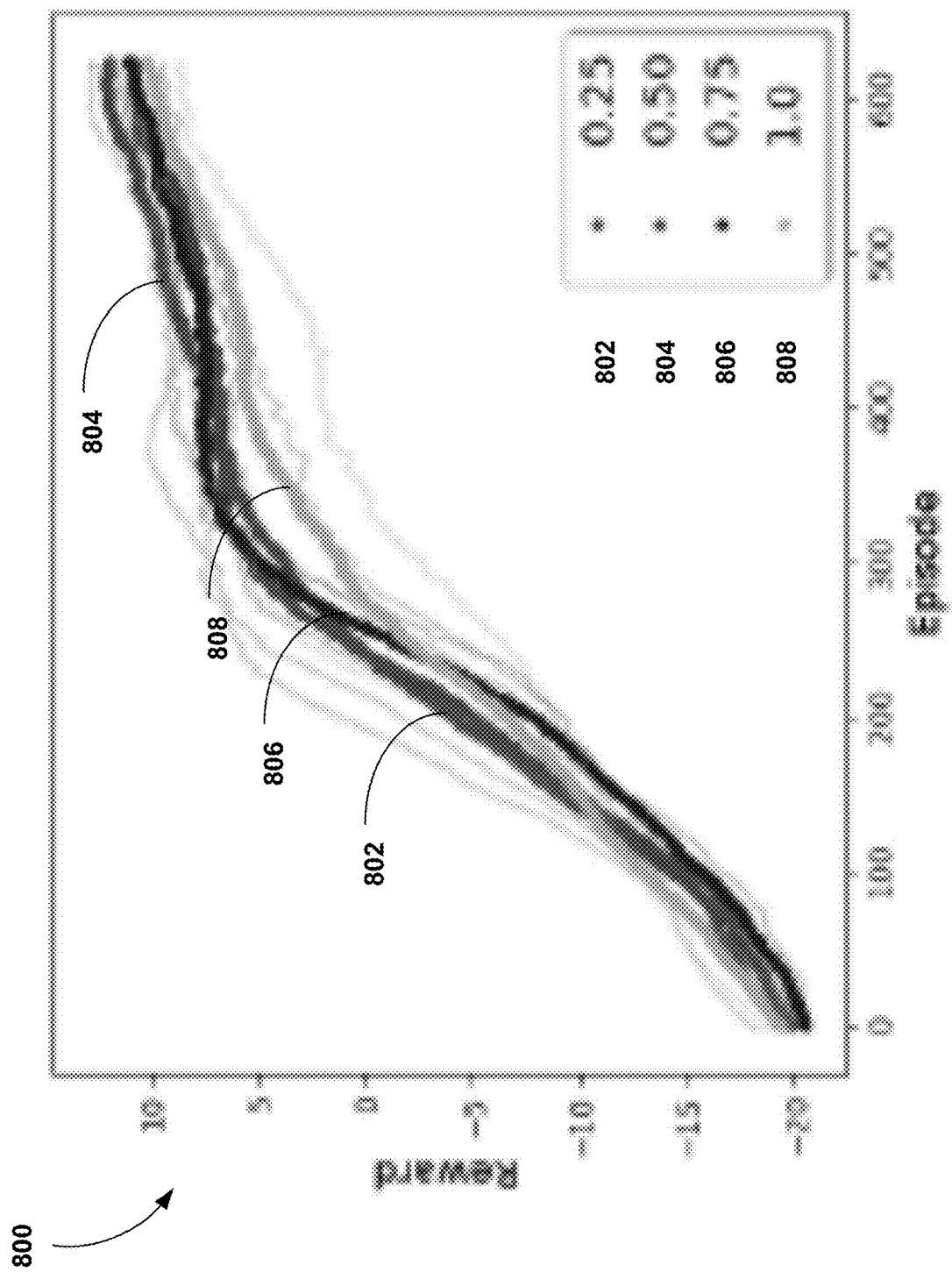
FIG. 8A illustrates, in a graph, an example of a sensitivity analysis of episodic rewards using terminal prediction in a game of Pong, in accordance with some embodiments.
Figure 8B:
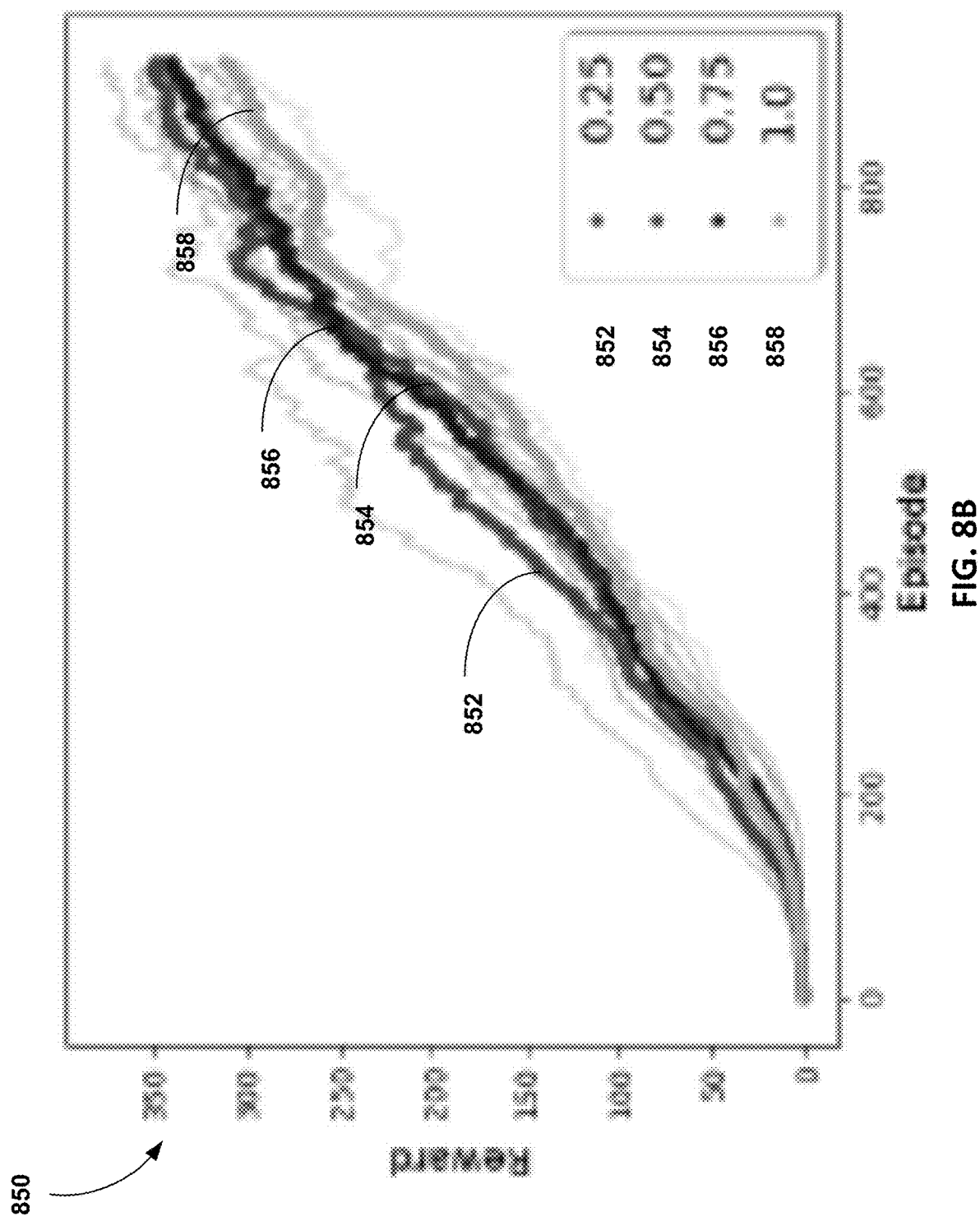
FIG. 8B illustrates, in a graph, an example of a sensitivity analysis of episodic rewards using terminal prediction in a game of Breakout, in accordance with some embodiments.

Preliminary experiments on two (fast to train) Atari games, i.e., Pong and Breakout were conducted. Learning performance on 4 values was tested: {0.25, 0.5, 0.75, 1} (802,852, 804,854, 806,856, 808,858) for the Terminal Prediction weight. Each curve was obtained from training with 3 random seeds. As FIGS. 8A and 8B show, the learning performance gets worse when $\lambda_{TP}=1$ 808, 858 as the agent puts too much emphasis on learning the auxiliary task compared to the main policy learning task. On the other hand, when $\lambda_{TP}=0.25$ the variance is higher for both games 802, 852. Given this preliminary analysis where intermediate values of {0.5, 0.75} (804,854, 806,856) perform more reliably, $\lambda_{TP}=0.5$ 804,854 was selected for all the experiments.

Figure 9A:
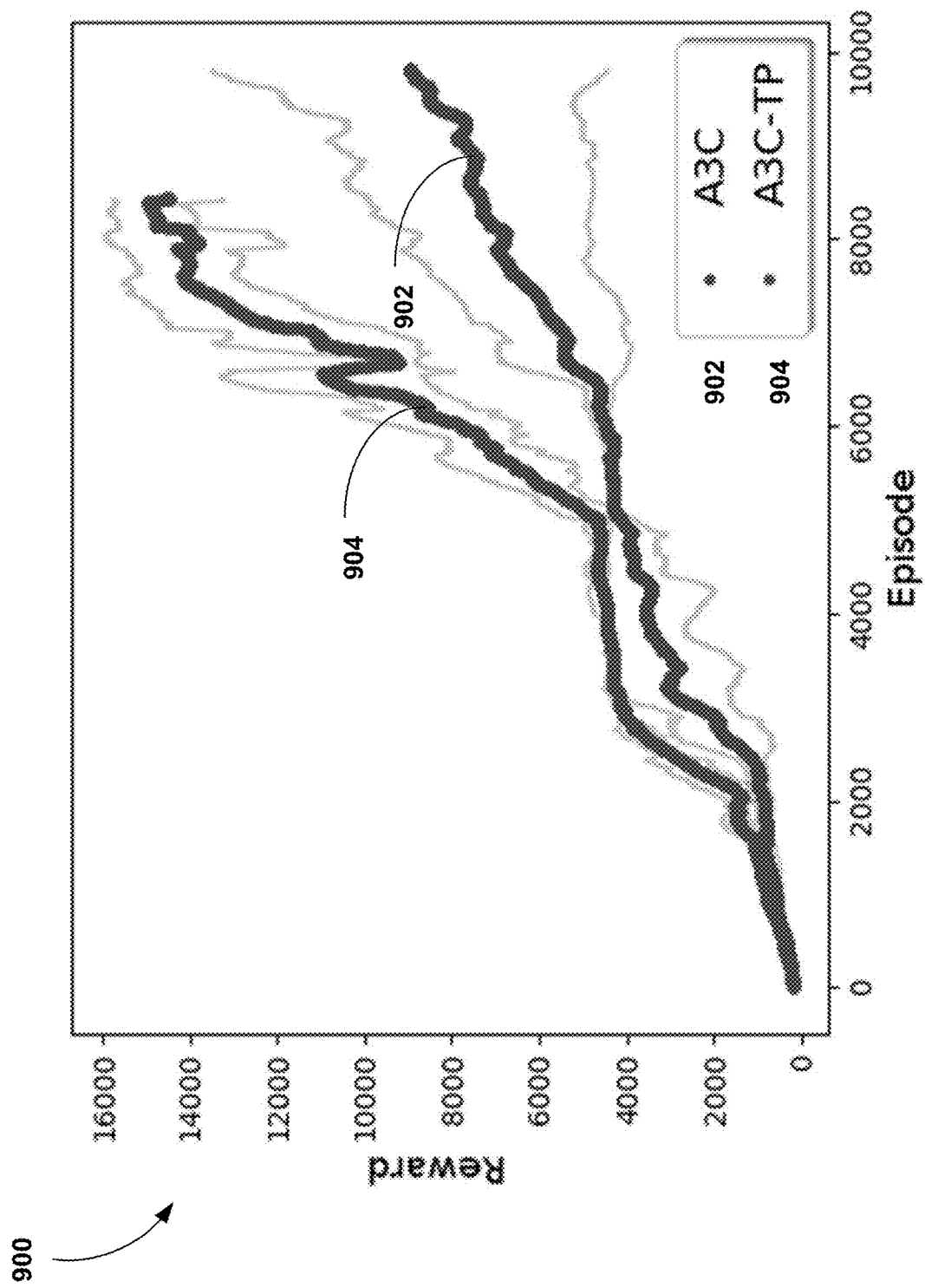
FIGS. 9A to 9E illustrate, in graphs, examples of a sensitivity analysis of episodic rewards using terminal prediction in various Atari games, in accordance with some embodiments.
Figure 9B:
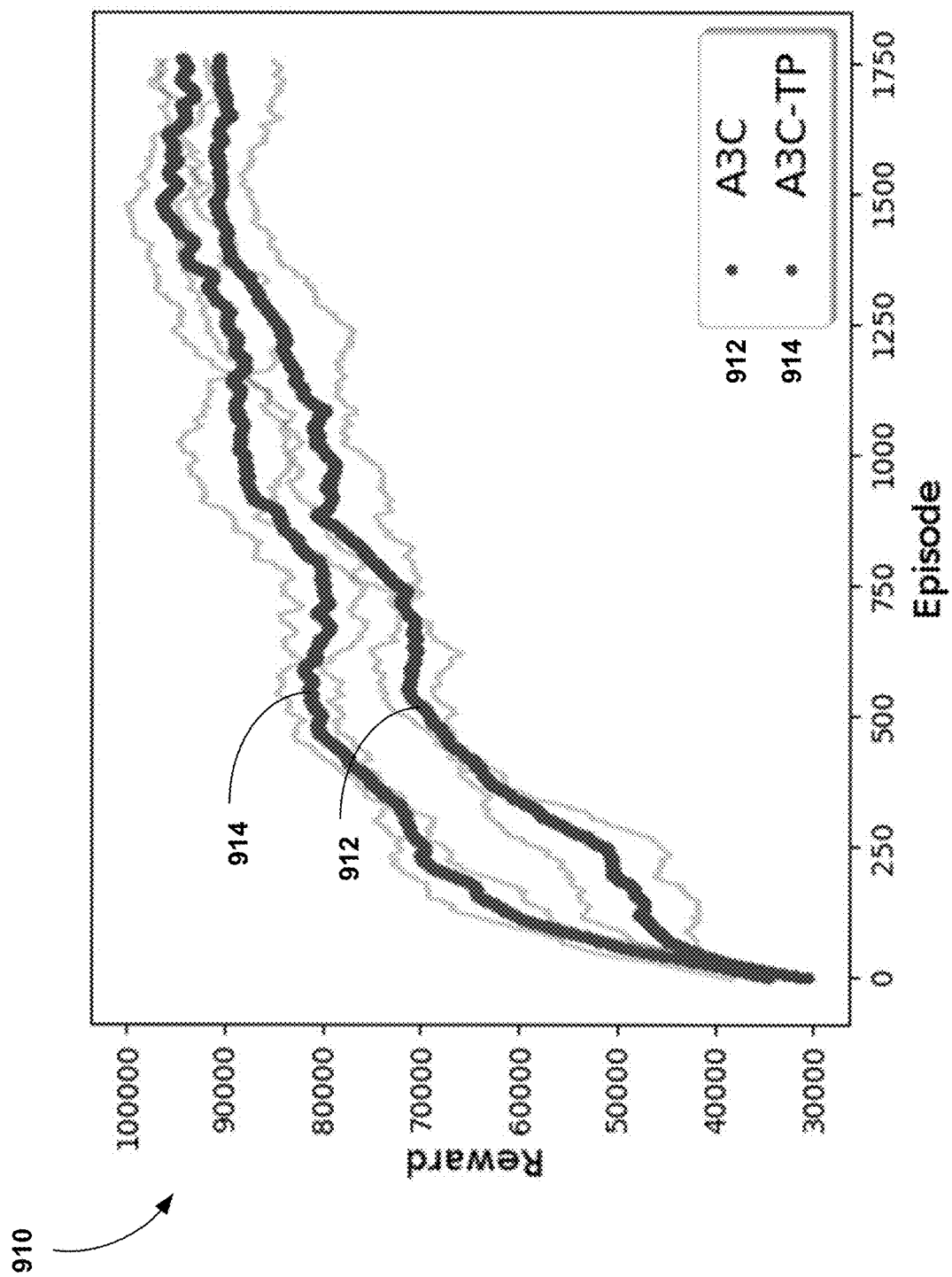
Figure 9C:
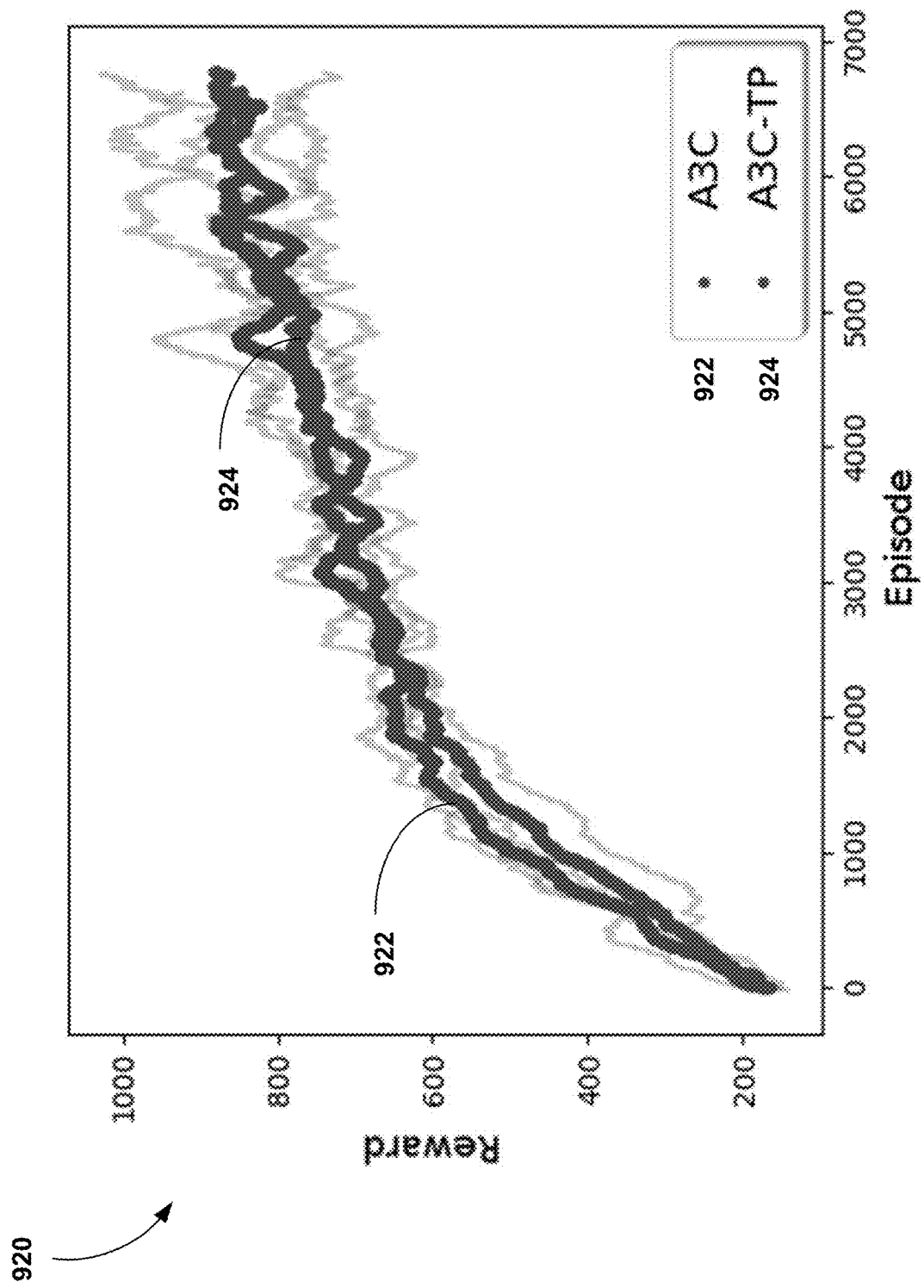
Figure 9D:
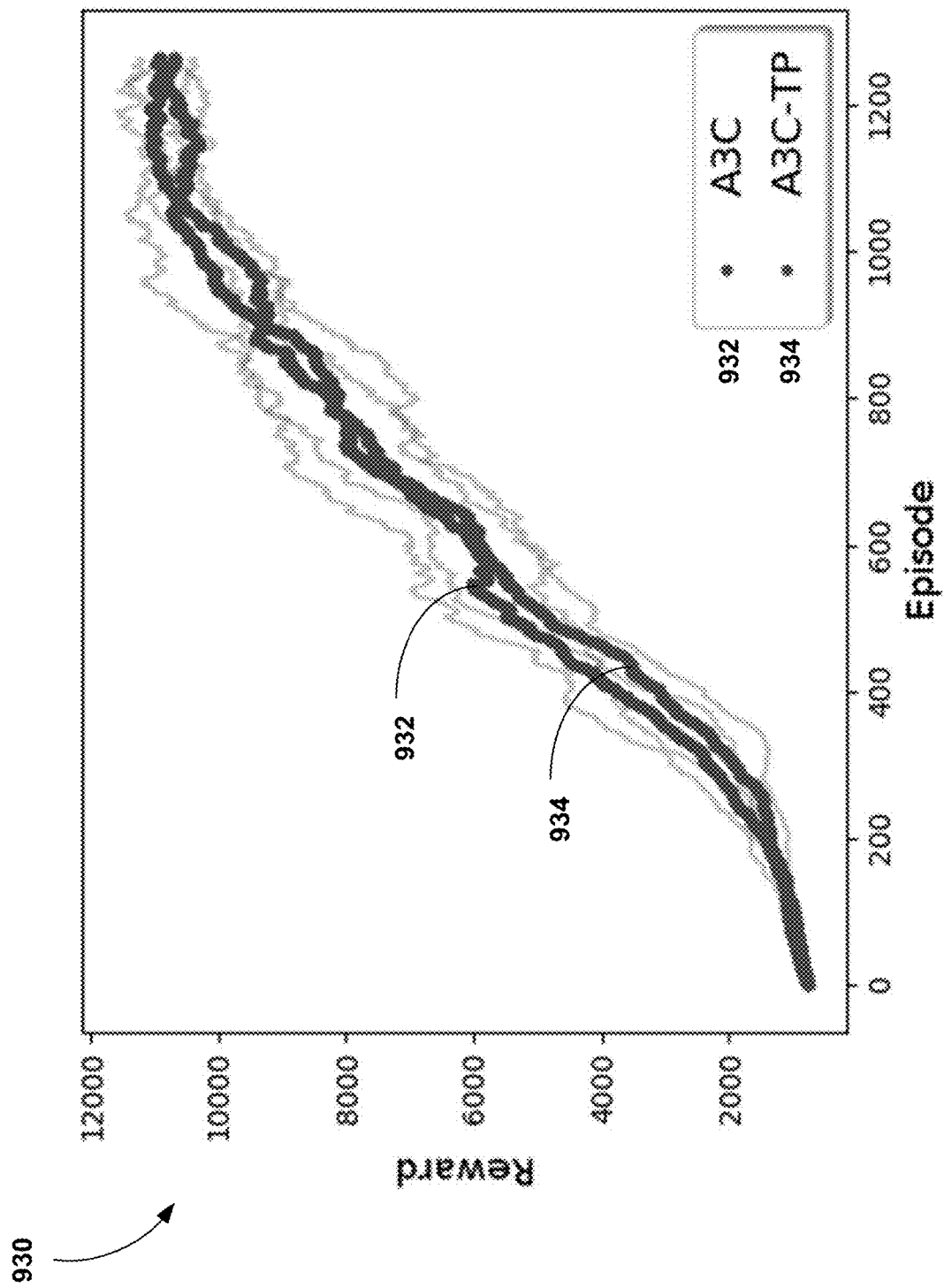
Figure 9E:
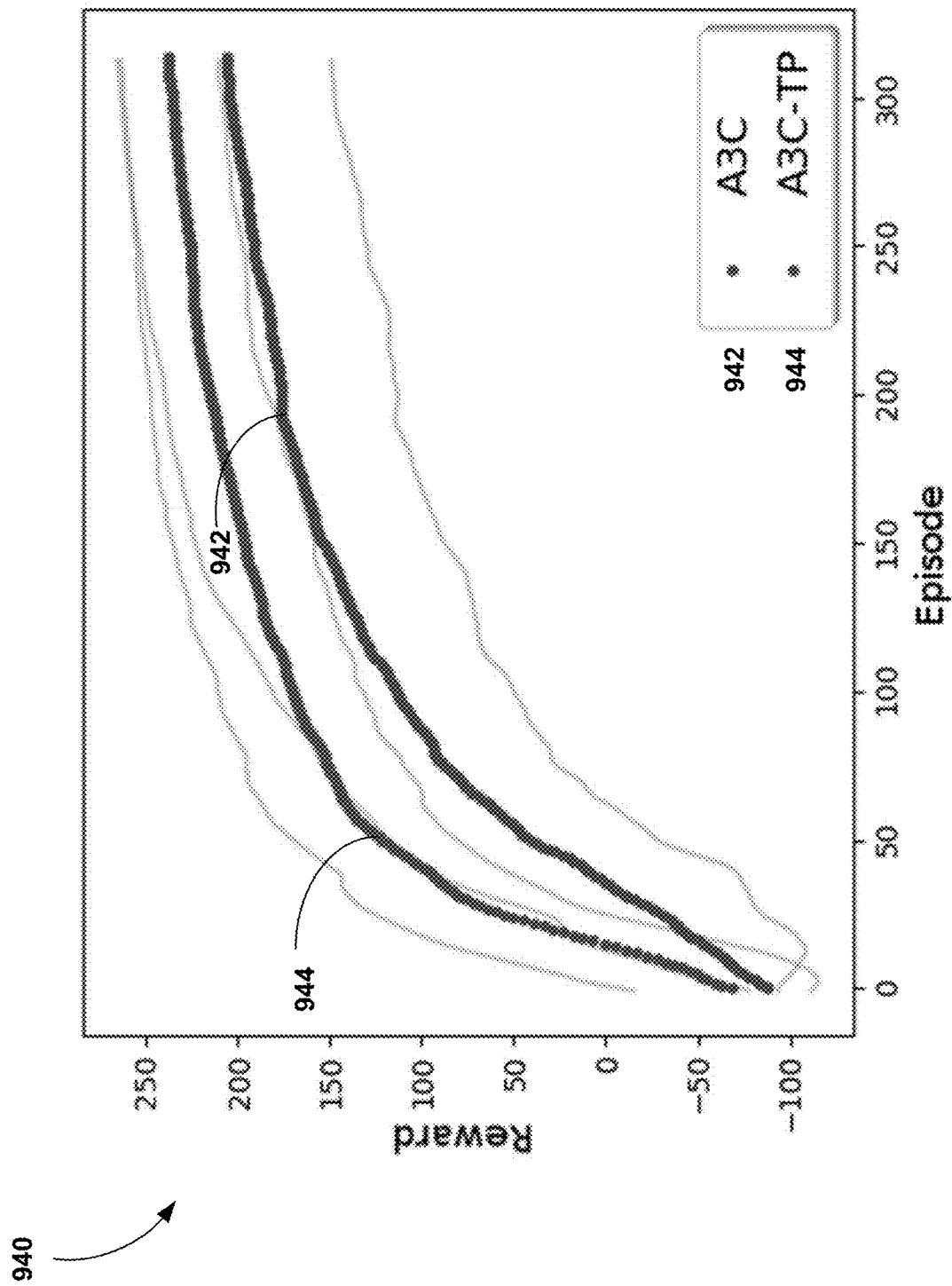

FIGS. 9A to 9E illustrate, in graphs, comparisons of the proposed method, A3C-TP against standard A3C. The proposed method significantly improves (904, 914) upon standard A3C 902, 912 in Q*bert (FIG. 9A) and CrazyClimber (FIG. 9B) games while performing similarly (922, 924, 932, 934, 942, 944) in the rest of the tested games (FIGS. 9C to 9E). As relatively easy games Pong and Breakout games were employed for sensitivity analysis for A3C-TP, they are omitted from FIGS. 9A to 9D. It appears that A3C-TP does not hurt the policy learning performance. However, it can provide improvement in some benchmarks.

FIG. 9E illustrates, in a graph, experimental results from a continuous action-space domain (Bipedal Walker) 940, in accordance with some embodiments. The experimental results 942, 944 show that A3C-TP outperforms A3C, and it has relatively lower variance.

Figure 10:
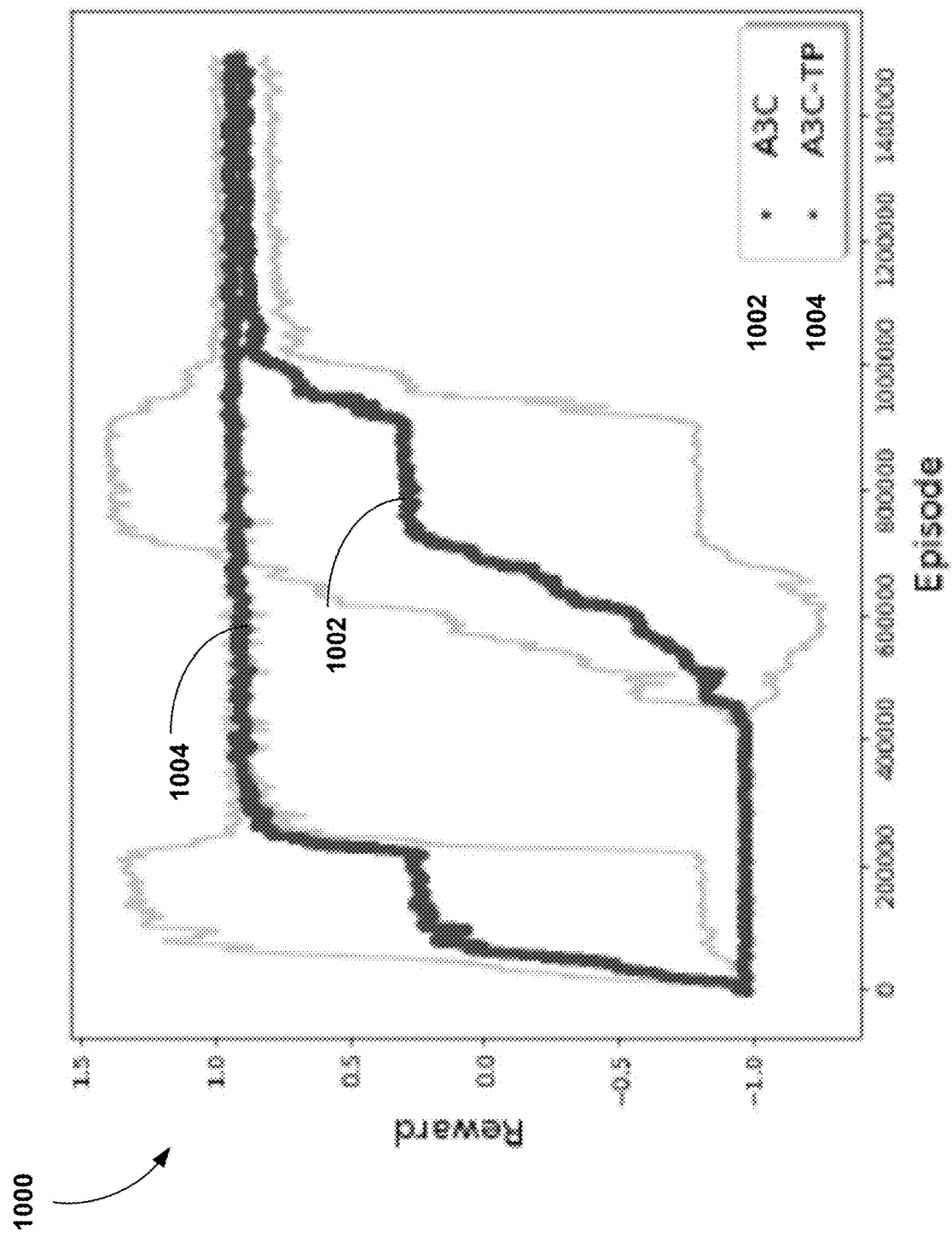
FIG. 10 illustrates, in a graph, another example of learning against a Static opponent, in accordance with some embodiments.
Figure 11:
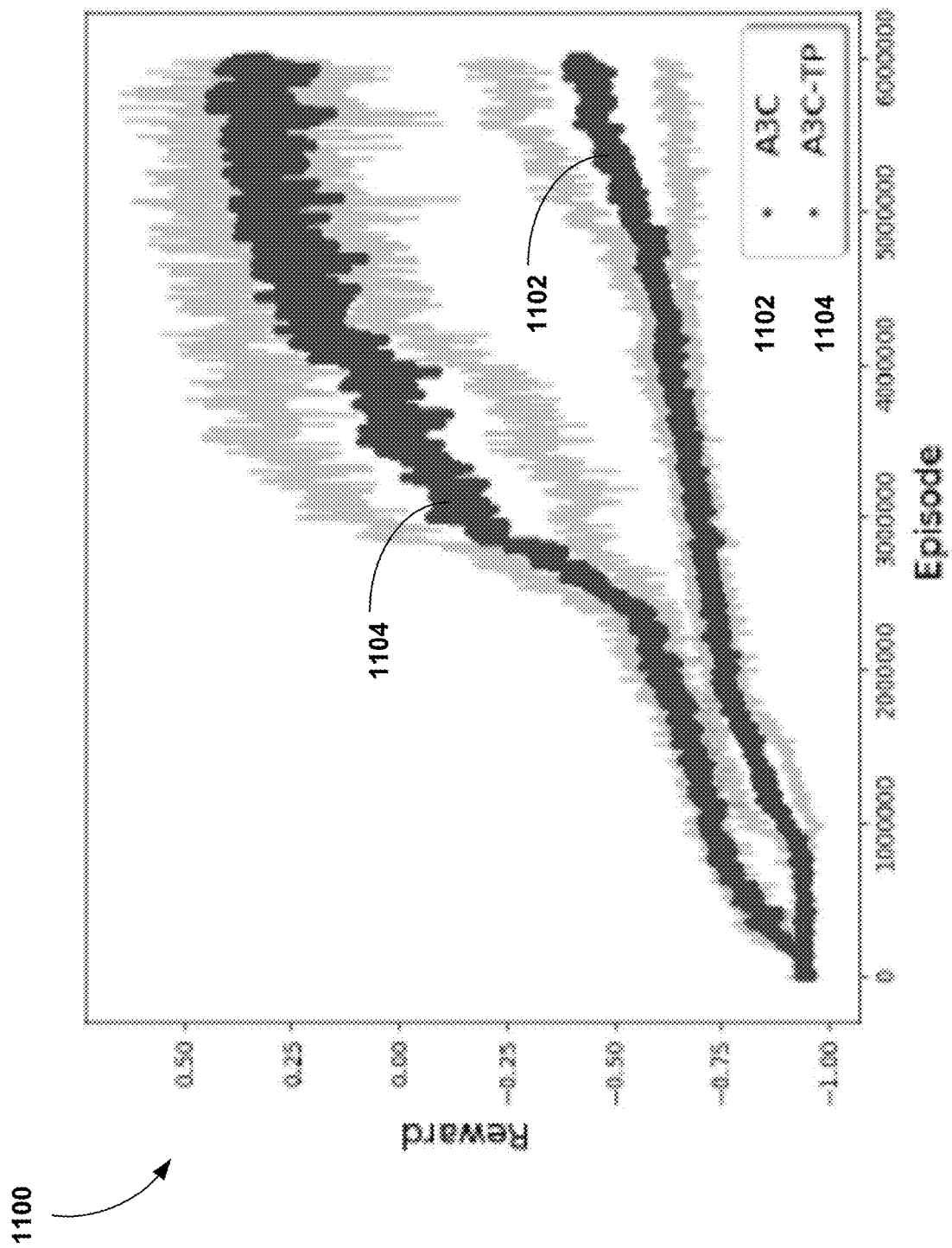
FIG. 11 illustrates, in a graph, another example of learning against a Rule-based opponent, in accordance with some embodiments.

FIG. 10 illustrates, in a graph, an example of learning against a static opponent 1000, in accordance with some embodiments. FIG. 11 illustrates, in a graph, an example of learning against a rule-based opponent 1100, in accordance with some embodiments. Moving average over 5 k games of the rewards (horizontal lines depict individual episodic rewards) is shown. Each training curve depicts average and standard deviation of 3 experiments with different random seeds. The proposed method, A3C-TP 1004, 1104, outperforms the standard A3C 1002, 1102 in terms of both learning faster and converging to a better policy in learning against both Static and Rule-based opponents. The training times was 6 hours for static opponent 1000 and 3 days for rule-based opponent 1100 both using 24 CPU cores.

The training results for A3C and the proposed method, A3C-TP, against a Static opponent are shown in FIG. 10. The A3C-TP method both converges much faster compared to the standard A3C. As Static opponents do not commit suicide, there are no false positives in observed positive rewards. However there are still false negatives due to our agent's possible suicides during training that negatively reinforces the essentially needed bombing skill. In this scenario, A3C takes almost one million episodes to converge because the agent needs to learn to execute a series of actions (without killing itself): get close to the enemy, place a bomb near the enemy and stay alive until the bomb explodes in 10 timesteps, eliminating the enemy. Only after successful execution of these actions, the agent obtains a non-zero external reward signal. One reason we present results and analysis against Static opponents is to convey how challenging the Pommerman domain is for purely model-free RL.

Against the Rule-based opponent 1100 the A3C-TP method learns faster, and it finds a better policy in terms of average rewards, see 1104 vs. 1102 in FIG. 11. Training against Rule-based opponents takes much longer, possibly due to episodes with false positive rewards.

There are several directions in which the above may be extended. One avenue is to find better ways on the MCTS and A3C integration. In the current framework, MCTS did not use A3C critic for state evaluation as critic itself is being trained. However, search method could be started later when critic network has been trained, thus value estimation is reliable to be used within search.

For Pommerman, one main challenge for pure model-free RL is the high probability of suicide with a −1 reward, when placing bombs. However, the agent cannot succeed without learning staying safe after bomb placement. The methods and ideas proposed herein directly targets this hard-exploration problem in different ways. The first method that experimentally showed progress as presented herein along this direction is the framework combining MCTS with A3C with continuous imitation learning which yielded less training episodes with suicides, i.e., evident from training curves. The second method in progress is ad-hoc invocation of an MCTS based demonstrator within asynchronous DRL methods that will be explained in detail.

What is presented clearly separates workers as either as planner/demonstrator-based or neural network based. Another direction to test is the ad-hoc usage of MCTS-based demonstrator within asynchronous DRL methods. Within an ad-hoc combination, all workers would use neural networks for action selection, except in "relevant" situations (based on some criteria) where they can pass the control to the simulated demonstrator. Indeed, one motivation for the Terminal Prediction auxiliary task was to utilize its prediction while deciding when to ask for a demonstrator action, thus becoming the criteria to perform ad-hoc demonstration. In that case, if the Terminal Prediction head predicts a value close to 1, this would signal the agent that episode is near a terminal state, e.g., which can be a suicide. Then, the demonstrator planner would be asked to take over in such cases which eventually would result in an increase in the number of episodes with positive rewards to improve learning.

Ad-hoc invocation of demonstrator is possible when the Terminal Prediction head outputs reliable values, i.e., possible after some warm-up training period.

Deep reinforcement learning (DRL) has been progressing with a fast pace with many successes in recent years. There are still several challenges to address such as convergence to locally optimal policies and long training times. Herein, a new method was described, namely A3C-TP, extending the A3C method with an auxiliary task of Terminal Prediction that predicts temporal closeness to terminal states. Also described was a framework that combines MCTS as a simulated demonstrator within A3C method improving the learning performance. Although embodiments of blending MCTS with A3C were presented, this framework can be easily extended to other embodiments of planners and distributed DRL methods. The experiments were conducted on a two-player mini version of the Pommerman game.

As presented above, the work is on-policy, and no experience replay buffer was maintained. For example, UNREAL uses a buffer to optimize auxiliary tasks. Similarly, interactions from MCTS demonstrator may be saved to a buffer to improve learning.

Another important direction is to extend the approach with opponent modeling capability. This may lead to better best-response strategies.

For all methods describe above, a deep neural network architecture was used with 4 convolutional layers, each of which have 32 filters and 3×3 kernels, with stride and padding of 1, followed with 1 dense layer with 128 hidden units, followed with 2-heads for actor and critic where critic has a single output for state-value estimate for the observation, and actor has 6 probability outputs for the policy network. For A3C-TP, the same neural network setup as A3C is used except there is an additional head for auxiliary terminal prediction which has a sigmoid activation function. After convolutional and dense layers, Exponential Linear Unit (ELU) activation functions were used. In some embodiments, the neural network architecture is not tuned.

NN State Representation: 28 feature maps were maintained that are constructed from the agent observation. These channels maintain location of walls, woods, tuneups, agents, bombs, flames. Agents have different properties such as bomb kick, bomb blast radius, and number of bombs. We maintain 3 feature maps for these abilities per agent, in total 12 is utilized to support up to 4 agents. A feature map was also maintained for the remaining lifetime of flames. All the feature channels can be readily extracted from agent observation except opponents' properties and flames' remaining lifetime which can be tracked efficiently by comparing sequential observations for fully observable scenarios.

In some embodiments, a through hyperparameter tuning may be performed. In others, such a tuning may not be performed due to long training times. For A3C, the default weight parameters may be employed, i.e., 1 for actor loss, 0.5 for value loss, and 0.01 for entropy loss. For new loss terms proposed above, $\lambda_{TP}=1$ may be set for Terminal Prediction. For Planner Imitation task, $\lambda_{PI}=1$ may be used for MCTS based worker, $\lambda_{PI}=0$ for the rest of workers.

In some embodiments, a through hyperparameter tuning was not performed due to long training times. For a discount factor, $\gamma=0.999$. For A3C loss, $\lambda_v=0.5$, $\lambda_\pi=1.0$, and $\lambda_H=0.01$ are employed as default weights. For the Planner Imitation task, $\lambda_{PI}=1$ is used for the MCTS worker.

An Adam optimizer may be employed for neural network training. A learning rate of 0.0001 and a discount factor of 0.999 may be used. Higher learning rates did not result in better learning curves, often yielded high loss values. However, it was noted that for the Adam optimizer, $\epsilon=1\times10^{-5}$ provides a more stable learning curve (less catastrophic forgetting) than its default value of $1\times10^{-8}$. For L2 regularization, a weight decay of $1\times10^{-5}$ may be used within Adam optimizer.

After rollouts, demonstrator action is selected by the max visit count, a.k.a. Robust Child. Default UCB1 exploration constant of $\sqrt{2}$ is used. The max search tree depth from any given state is set to 25 given the low search budget. The value head by the NN is not used by vanilla MCTS.

Atari games have been used by RL researchers, but Pommerman was recently released and there are many open problems. While there are a variety of auxiliary tasks proposed in the literature, and they are in general heuristics proposed as additional self-supervised learning targets to help RL agents to improve its representation learning with more contextual information, more theoretical understanding of auxiliary tasks and how to devise them automatically is still an open research avenue.

TP could be employed for safe exploration and within the context of learning from demonstrations. TP values could be used to bias the exploration strategy within the context of safe RL. For example, the RL agent could combine state-value function estimates with TP estimate: it can trigger exploitation when both state-value and TP estimates are high (e.g., a win case) whereas exploration could be triggered when state-value estimate is low and TP estimate is high, implying for example, a dead-end for the agent.

TP values can be used for better integration of demonstrators and model-free RL within the context of imitation learning. For example, a (search-based, simulated) demonstrator can be asked for action-guidance when the TP value is high and state-value estimate is low, i.e., implying the episode is predicted to be close to a terminal state against the favor of the agent. TP estimates could also be used to determine a reward discounting schedule or the effective horizon length to consider future rewards.

Use Case Scenarios

Adding auxiliary tasks to DRL can have many applications, including stock trading applications, game playing, robot control, traffic routing, Internet congestion control, sepsis treatment, multi-driver order dispatching, air traffic control, recommender systems, seat inventory control and overbooking, etc.

Terminal prediction is useful in any situation where RL can used in an episodic setting. The key insight is that learning to predict the end of an episode should help the neural network learn to solve the true task faster than if the neural network does not make this prediction.

Action guidance via MCTS/demonstrations is useful there are demonstrations from another agent/person, or have a simulator so that we can do MCTS planning. The demonstrations do not need to be optimal. Higher quality demonstrations would work better, but the PI approach allows the agent to leverage the demonstrations to learn faster, and can learn to outperform the demonstrator.

Using Terminal Prediction in a stock trading application, the agent can learn to predict when the order will be completed. On every step, the agent makes a prediction about how long it will be until the order completes. Note that in the disclosure above, an assumption is made that does not hold in this case. The assumption was that we can use the average length of previous episodes to approximate the length of the current episode. This will not hold in the stock trading domain, since different orders can have very different execution lengths. Instead, the method would wait until the end of the episode and then go back and update the network for each of the actions, which would add some memory overhead.

Using Action Guidance in a stock trading application, a human trader or legacy system can be used as a demonstrator to assist the learning agent. For example, the stock trading algorithm tries to optimize the value weighted average price (VWAP). There are legacy algorithms that are also designed to optimize VWAP. While the agent is training, it can query the legacy algorithm to determine what it would do in the current state. Then, it can use this data to help bias its own learning. If there is a stock market simulator, the agent can perform look ahead search with MCTS. Even though the simulator would never be perfect, the MCTS planning algorithm could provide suggested actions on every time step. Then, the learning agent can use this data to help bias its own learning.

Using Terminal Prediction in game playing is useful in both multi-agent and single agent cases for predicting the end of an episode. When the agent can better predict the end of an episode, it can more quickly learn a good control policy. Another possibility is that if the agent predicts it is near the end of an episode and the expected reward is low, it is an indication that the agent should stop and ask a human for advice, attempting to avoid the poor outcome.

Using Action Guidance in game playing is useful in both multi-agent and single agent cases. As in the stock trading case, demonstrations from a human or another algorithm can be leveraged to better guide learning. Or, if there is a simulator available, a planning algorithm like MCTS could be used to produce demonstrations that could help to better guide learning.

Terminal Prediction for robot control may be used to learn to predict when the episode will end (e.g., the robot falls over). The application is similar to the game playing case above.

Action Guidance for robot control may be used to provide some suggested behavior to the robot. This is similar to the above settings where advice could come from a human or another algorithm.

In traffic routing, agents may control stop lights and are trying to learn how to maximize traffic flow and/or minimize traffic delay times.

Terminal Prediction is typically not applicable for traffic routing as the task is continuous (traffic just keeps flowing).

Action Guidance for traffic routing may be applied in a similar manner as in the game playing setting, where advice could come from humans or another algorithm. This is particularly relevant since there are many existing traffic control algorithms that could be used to help jump-start learning for each individual traffic light.

A framework that uses a non-expert simulated demonstrator within a distributed asynchronous deep RL method to succeed in hard-exploration domains is provided. The experiments use the recently proposed Pommerman domain, a very challenging benchmark for pure model-free RL methods. In Pommerman, one main challenge is the high probability of suicide while exploring (yielding a negative reward), which occurs due to the delayed bomb explosion. However, the agent cannot succeed without learning how to stay safe after bomb placement. The methods and ideas proposed herein address this hard-exploration challenge. One aspect of the framework is to use MCTS as a shallow demonstrator (small number of rollouts). In the framework, model-free workers learn to safely explore and acquire this skill by imitating a shallow search-based non-expert demonstrator. Different experiments were performed that varied the quality and the number of demonstrators. The results show that the proposed method shows significant improvement in learning efficiency across different opponents.

There are several directions to extend the use of the framework and methods. A Breadth-First Search to initialize state-action value estimates by identifying near terminal states before starting MCTS based lookahead search can be tested within the framework. Also, MCTS-minimax hybrids method can be employed as the demonstrator, which can provide better tactical play through minimax search. Another avenue is to formulate the problem so that ad-hoc invocation of an MCTS-based simulator can be employed, i.e., action guidance can be employed only when the model-free RL agent needs one. For example, in Pommerman this means whenever a bomb is about to go off or near enemies where enemy engagement requires strategic actions.

The framework and methods herein are on-policy for better comparison to the standard A3C method—where there is no experience replay buffer maintained. This means that MCTS actions are used only once to update neural network and thrown away. In contrast, UNREAL uses a buffer and gives higher priority to samples with positive rewards. A similar approach can be taken to save demonstrator's experiences to a buffer and sample based on the rewards.

A novel self-supervised auxiliary task, i.e., Terminal Prediction (TP), estimating temporal closeness to terminal states for episodic tasks is provided. The TP helps representation learning by letting the agent predict how close it is to a terminal state, while learning its control policy. It should be understood that TP could be integrated with multiple algorithms, even though this disclosure focused on Asynchronous Advantage Actor-Critic (A3C) and demonstrating the advantages of A3C-TP (an example). The evaluation described above includes: a set of Atari games, the BipedalWalker domain, and a mini version of the recently proposed multi-agent Pommerman game. The results shown above on Atari games and the BipedalWalker domain show that A3C-TP outperforms standard A3C in most of the tested domains and in others it has similar performance. In Pommerman, the proposed method provides significant improvement both in learning efficiency and converging to better policies against different opponents.

Figure 12:
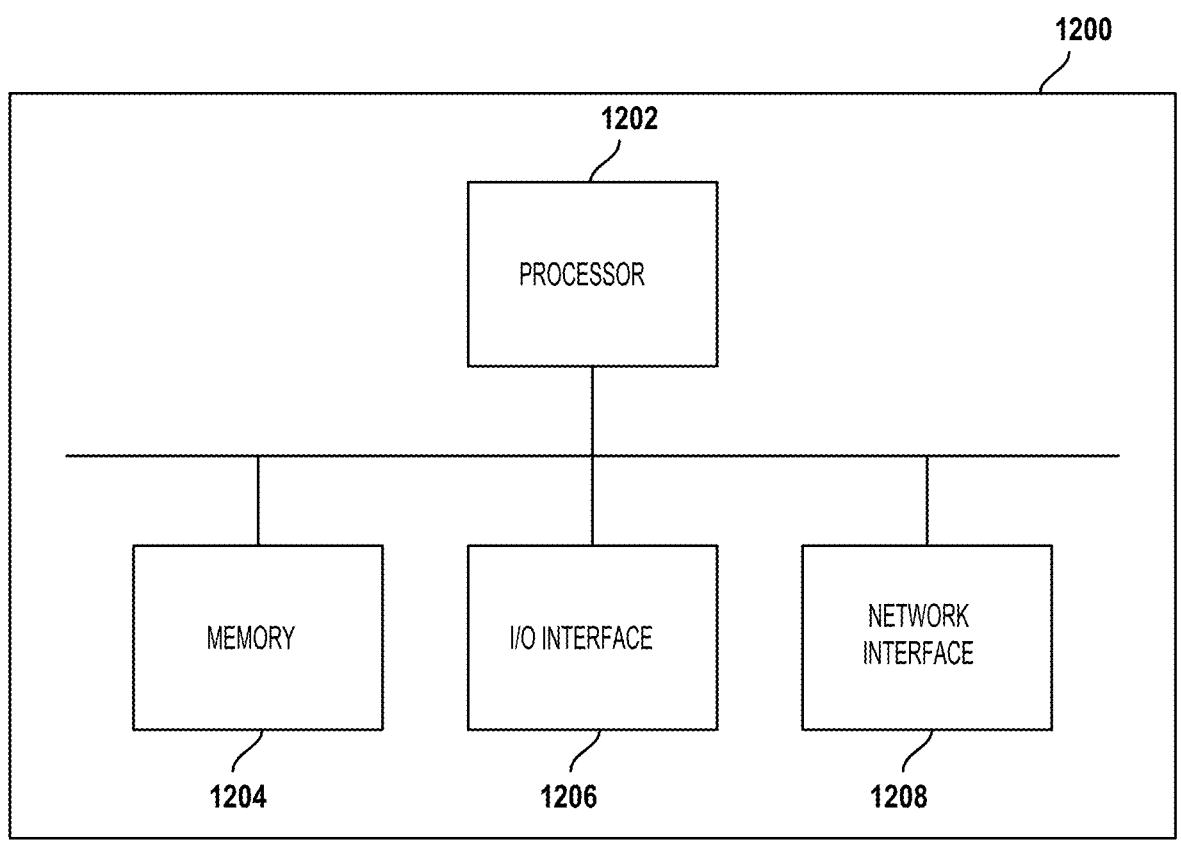
FIG. 12 is a schematic diagram of a computing device such as a server.

FIG. 12 is a schematic diagram of a computing device 1200 such as a server. As depicted, the computing device includes at least one processor 1202, memory 1204, at least one I/O interface 1206, and at least one network interface 1208.

Processor 1202 may be an Intel or AMD x86 or x64, PowerPC, ARM processor, or the like. Memory 1204 may include a suitable combination of computer memory that is located either internally or externally such as, for example, random-access memory (RAM), read-only memory (ROM), compact disc read-only memory (CDROM).

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

In some embodiments, there is provided a computer system for extending parallelized asynchronous reinforcement. The system comprises a data storage configured to store one or more data structures representing interconnected computing units of the neural network, including data fields storing weighted interconnections between the interconnected computing units, a plurality of hardware processors or threads of hardware processors, a parallel processing controller configured for coordinated operation of the plurality of hardware processors or threads of hardware processors such that each functions as a worker agent that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment, and wherein the loss determination includes at least a policy loss term (actor), a value loss term (critic), and an auxiliary control loss.

In some embodiments, there is provided a method extending parallelized asynchronous reinforcement learning for training a neural network. The method comprises controlling a plurality of hardware processors or threads of hardware processors such that each functions as a worker agent simultaneously interacting with a computing environment for local gradient computation based on a loss determination and updating global network parameters based at least on the local gradient computation to train the neural network, wherein the loss determination includes at least a policy loss term (actor), a value loss term (critic), and an auxiliary control loss.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer system for extending parallelized asynchronous reinforcement learning to include terminal state prediction for training a neural network, the system comprising:
    a data storage configured to store one or more data structures representing interconnected computing units of the neural network, including data fields storing weighted interconnections between the interconnected computing units;
    a plurality of hardware processors or threads of hardware processors;
    a parallel processing controller configured for coordinated operation of the plurality of hardware processors or threads of hardware processors such that each functions as a worker agent that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment;
    wherein the loss determination includes at least a policy loss term (actor), a value loss term (critic), and a terminal state prediction control loss.

2. The system as claimed in claim 1, wherein the terminal state prediction control loss is determined by using mean squared error between the predicted probability of closeness to a terminal state of any given state.

3. The system as claimed in claim 2, wherein the neural network is configured to utilize a terminal state prediction control loss function in accordance with the relation:

$$\mathcal{L}_{TP} = \frac{1}{N}\sum_{i=0}^{N}(y_i - y_i^p)^2$$

where N represents an average length of previous episode lengths during training.

4. The system as claimed in claim 3, wherein the neural network includes a plurality of convolutional layers, and a plurality of fully connected layers.

5. The system as claimed in claim 4, wherein the neural network is configured to utilize a loss function in accordance with the relation:

$$\mathcal{L}_{A3C\text{-}TP} = \mathcal{L}_{A3C} + \lambda_{TP}\mathcal{L}_{TP}$$

wherein $\lambda_{TP}$ comprises a weight term; and
wherein $\mathcal{L}_{A3C}$ comprises the policy loss term and the value loss term.

6. A computer system for extending parallelized asynchronous reinforcement learning to include planner imitation for training a neural network, the system comprising:
    a data storage configured to store one or more data structures representing interconnected computing units of the neural network, including data fields storing weighted interconnections between the interconnected computing units;
    a plurality of hardware processors or threads of hardware processors;
    a parallel processing controller configured for coordinated operation of the plurality of hardware processors or threads of hardware processors such that each functions as a worker agent that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment;
    wherein the loss determination includes at least a policy loss term (actor), a value loss term (critic), and a planner imitation control loss.

7. The system as claimed in claim 6, wherein the planner imitation control loss is determined by using a supervised cross entropy loss between a one-hot encoded action used by a planner in response to an observation, and an action that a policy network would take for the same observation during an episode of length N.

8. The system as claimed in claim 7, wherein the neural network is configured to utilize a planner imitation control loss function in accordance with the relation:

$$\mathcal{L}_{PI} = -\frac{1}{N}\sum_{i}^{N} a^i \log(\hat{a}^i),$$

wherein $a^i$ represents the one-hot encoded action used by the planner; and
wherein $\hat{a}^i$ represents the action the policy network would take for the same observation.

9. The system as claimed in claim 8, wherein the neural network includes a plurality of convolutional layers, and a plurality of fully connected layers.

10. The system as claimed in claim 9, wherein the neural network is configured to utilize a loss function in accordance with the relation:

$$\mathcal{L}_{PI\text{-}A3C} = \mathcal{L}_{A3C} + \lambda_{PI}\mathcal{L}_{PI}$$

wherein $\lambda_{PI}$ is a weight term; and
wherein $\mathcal{L}_{A3C}$ comprises the policy loss term and the value loss term.

11. A computer implemented method for extending parallelized asynchronous reinforcement learning to include terminal state prediction for training a neural network, the method comprising:
    maintaining one or more data structures representing interconnected computing units of the neural network, including data fields storing weighted interconnections between the interconnected computing units;
    coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;

wherein the loss determination function includes at least a policy loss term (actor), a value loss term (critic), and a terminal state prediction control loss.

12. The method as claimed in claim 11, wherein the terminal state prediction control loss is determined by using mean squared error between the predicted probability of closeness to a terminal state of any given state.

13. The method as claimed in claim 12, wherein the neural network is configured to utilize a terminal state prediction control loss function in accordance with the relation:

$$\mathcal{L}_{TP} = \frac{1}{N}\sum_{i=0}^{N}(y_i - y_i^p)^2$$

where N represents an average length of previous episode lengths during training.

14. The method as claimed in claim 13, wherein the neural network includes a plurality of convolutional layers, and a plurality of fully connected layers.

15. The method as claimed in claim 14, wherein the neural network is configured to utilize a loss function in accordance with the relation:

$$\mathcal{L}_{A3C\text{-}TP} = \mathcal{L}_{A3C} + \lambda_{TP}\mathcal{L}_{TP}$$

wherein $\lambda_{TP}$ comprises a weight term; and wherein $\mathcal{L}_{A3C}$, comprises the policy loss term and the value loss term.

16. A computer implemented method for extending parallelized asynchronous reinforcement learning to include planner imitation for training a neural network, the method comprising:

maintaining one or more data structures representing interconnected computing units of the neural network, including data fields storing weighted interconnections between the interconnected computing units;

coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;

wherein the loss determination function includes at least a policy loss term (actor), a value loss term (critic), and a planner imitation control loss.

17. The method as claimed in claim 16, wherein the planner imitation control loss is determined by using a supervised cross entropy loss between a one-hot encoded action used by a planner in response to an observation, and an action that a policy network would take for the same observation during an episode of length N.

18. The method as claimed in claim 17, wherein the neural network is configured to utilize a planner imitation control loss function in accordance with the relation:

$$\mathcal{L}_{PI} = -\frac{1}{N}\sum_{i}^{N} a^i \log(\hat{a}^i),$$

wherein $a^i$ represents the one-hot encoded action used by the planner; and wherein $\hat{a}^i$ represents the action the policy network would take for the same observation.

19. The method as claimed in claim 18, wherein the neural network includes a plurality of convolutional layers, and a plurality of fully connected layers.

20. The method as claimed in claim 19, wherein the neural network is configured to utilize a loss function in accordance with the relation:

$$\mathcal{L}_{PI\text{-}A3C} = \mathcal{L}_{A3C} + \lambda_{PI}\mathcal{L}_{PI}$$

wherein $\lambda_{PI}$ is a weight term; and wherein $\mathcal{L}_{A3C}$, comprises the policy loss term and the value loss term.

* * * * *